(12) United States Patent
Buermeyer et al.

(10) Patent No.: US 12,521,940 B2
(45) Date of Patent: Jan. 13, 2026

(54) COMPLIANT RECOATER ASSEMBLIES, SYSTEMS, AND RELATED METHODS

(71) Applicant: VulcanForms Inc., Devens, MA (US)

(72) Inventors: Lucas Buermeyer, Ayer, MA (US); William Curtis Stone, Tewksbury, MA (US); Raghav Aggarwal, Dracut, MA (US)

(73) Assignee: VulcanForms Inc., Devens, MA (US)

( * ) Notice: Subject to any disclaimer, the term of this patent is extended or adjusted under 35 U.S.C. 154(b) by 240 days.

(21) Appl. No.: 18/331,112

(22) Filed: Jun. 7, 2023

(65) Prior Publication Data

US 2024/0408818 A1 Dec. 12, 2024

(51) Int. Cl.
*B29C 64/214* (2017.01)
*B22F 12/67* (2021.01)
*B29C 64/153* (2017.01)
*B29C 64/268* (2017.01)
*B33Y 10/00* (2015.01)
*B33Y 40/00* (2020.01)
*B33Y 30/00* (2015.01)

(52) U.S. Cl.
CPC ............ *B29C 64/214* (2017.08); *B22F 12/67* (2021.01); *B29C 64/153* (2017.08); *B29C 64/268* (2017.08); *B33Y 10/00* (2014.12); *B33Y 40/00* (2014.12); *B33Y 30/00* (2014.12)

(58) Field of Classification Search
CPC .............................. B29C 64/214; B22F 12/67
See application file for complete search history.

(56) References Cited

U.S. PATENT DOCUMENTS

| | | | |
|---|---|---|---|
| 9,956,612 B1 | 5/2018 | Redding et al. | |
| 10,022,795 B1 | 7/2018 | Redding et al. | |
| 10,569,364 B2 * | 2/2020 | Shi | B22F 12/67 |
| 10,646,924 B2 * | 5/2020 | Spears | B29C 64/153 |
| 10,828,832 B2 * | 11/2020 | Prakash | B29C 64/245 |
| 10,894,360 B2 * | 1/2021 | Prakash | B22F 12/55 |

(Continued)

FOREIGN PATENT DOCUMENTS

| | | | |
|---|---|---|---|
| EP | 3 521 028 A1 | 8/2019 | |
| WO | WO-2024253688 A1 * | 12/2024 | B29C 64/214 |
| WO | WO 2025/006255 A2 | 1/2025 | |

OTHER PUBLICATIONS

International Search Report and Written Opinion mailed Feb. 20, 2024 in connection with International Application No. PCT/US2023/068095.

*Primary Examiner* — Atul P. Khare
(74) *Attorney, Agent, or Firm* — Wolf, Greenfield & Sacks, P.C.

(57) ABSTRACT

Disclosed embodiments are generally related to recoater assemblies for additive manufacturing systems. In some embodiments, a recoater blade may include a plurality of flexible portions that are configured to deflect relative to one another when moved over and past a defect on a build surface. In other embodiments, a recoater assembly may include compliant attachments that exhibit compliances that increase in an outward direction relative to a central portion of a body of the recoater assembly. In still other embodiments, a pair of scoops may be disposed on opposing end portions of a recoater blade and/or recoater assembly to help guide and collect excess powder dispensed onto a build surface.

25 Claims, 11 Drawing Sheets

(56) References Cited

U.S. PATENT DOCUMENTS

| | | | |
|---|---|---|---|
| 11,458,681 B2* | 10/2022 | Shi | B29C 64/214 |
| 12,377,469 B2* | 8/2025 | Van Deest | B22F 10/28 |
| 2016/0158889 A1 | 6/2016 | Carter et al. | |
| 2016/0368050 A1 | 12/2016 | Morris et al. | |
| 2017/0021455 A1 | 1/2017 | Dallarosa et al. | |
| 2017/0056975 A1 | 3/2017 | Carter et al. | |
| 2017/0355136 A1 | 12/2017 | Matsumoto | |
| 2018/0200792 A1 | 7/2018 | Redding et al. | |
| 2018/0207722 A1 | 7/2018 | Feldmann et al. | |
| 2018/0236549 A1 | 8/2018 | Spears et al. | |
| 2019/0143406 A1 | 5/2019 | Carter et al. | |
| 2019/0299286 A1 | 10/2019 | Feldmann et al. | |
| 2020/0039000 A1 | 2/2020 | Sweetland | |
| 2020/0101663 A1* | 4/2020 | Prakash | B22F 12/67 |
| 2020/0108465 A1 | 4/2020 | Sweetland | |
| 2020/0230745 A1 | 7/2020 | Komsta et al. | |
| 2020/0376761 A1 | 12/2020 | Sweetland | |
| 2020/0376762 A1 | 12/2020 | Sweetland | |
| 2021/0339318 A1 | 11/2021 | Dunbar et al. | |
| 2022/0009030 A1 | 1/2022 | Dadelszen et al. | |
| 2023/0062971 A1 | 3/2023 | Navalgund et al. | |
| 2024/0424739 A1* | 12/2024 | Aggarwal | B22F 12/30 |

* cited by examiner

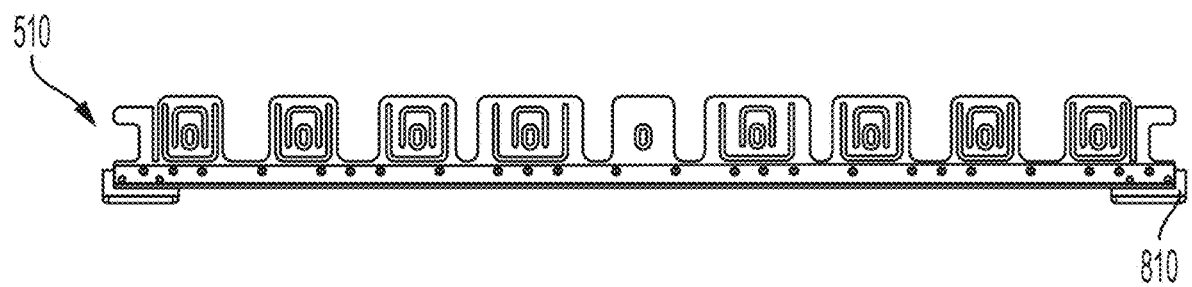
FIG. 8A
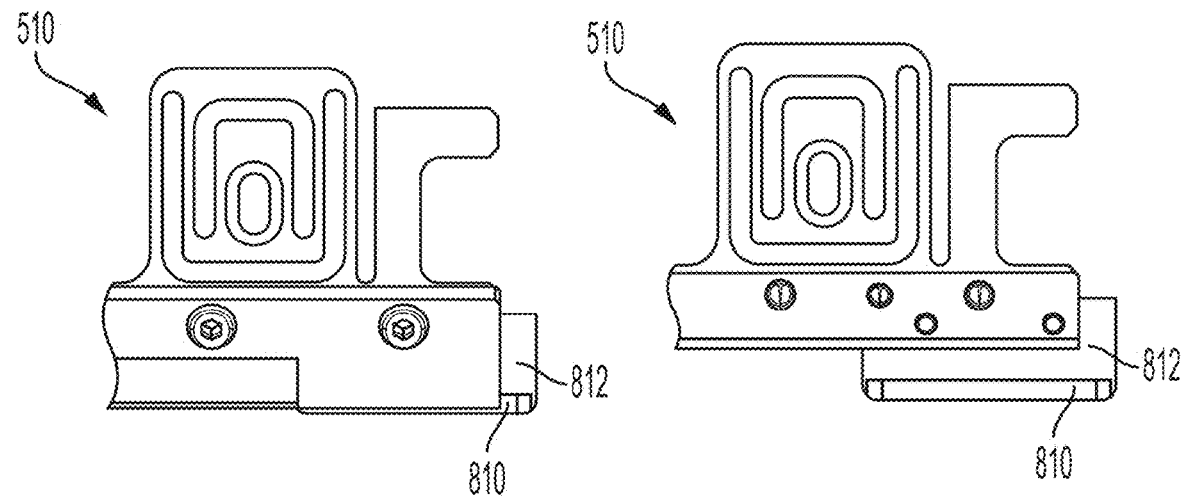
FIG. 8B
FIG. 8C

COMPLIANT RECOATER ASSEMBLIES, SYSTEMS, AND RELATED METHODS

FIELD

Disclosed embodiments are generally related to recoater assemblies for additive manufacturing systems that include one or more compliant features that reduce the amount of material used to additively manufacture an object.

BACKGROUND

Additive manufacturing systems employ various techniques to create three-dimensional objects from two-dimensional layers. After a layer of precursor material is deposited onto a build surface, a portion of the layer may be fused through exposure to one or more energy sources to create a desired two-dimensional geometry of solidified material within the layer. Next, the build surface may be indexed, and another layer of precursor material may be deposited. For example, in conventional systems, the build surface may be indexed downwardly by a distance corresponding to a thickness of a layer. This process may be repeated layer-by-layer to fuse many two-dimensional layers into a three-dimensional object.

After each layer is solidified, another layer of the precursor material is typically applied using a recoater assembly (that is to say, the recoater assembly is configured to dispense a powder precursor material onto a build surface), which can be used to deposit another layer of precursor material onto the previously fused layer and may also be used smooth the layer of precursor material before this newly deposited layer is solidified. However, defects can arise during this process, which may propagate to subsequent layers and result in an overall defect in the object. For example, as a recoater blade of the recoater assembly smooths the layer of precursor material, it may inadvertently displace or "fling" the precursor material, resulting in a defect within that layer.

SUMMARY

In one aspect, a recoater assembly is described, the recoater assembly comprising a recoater blade comprising a plurality of plates, wherein at least one plate of the plurality of plates comprises a plurality of grooves extending from a first portion of the plate including a first edge plate towards a second edge of the at least one plate opposite the first edge; and a body wherein the plurality of plates of the recoater blade are attached to the body with the grooves of the at least one plate extending away from the body. In some embodiments, an additive manufacturing system comprising the recoater assembly is described.

In another aspect, a recoater assembly is described, the recoater assembly comprising a body; a recoater blade attached to the body; and a plurality of compliant attachments disposed along at least a portion of a length of the body, wherein the plurality of compliant attachments are configured to be attached to a motion stage. In some embodiments, an additive manufacturing system comprising the recoater assembly is described.

In yet another aspect, a recoater assembly is described, the recoater assembly comprising a body; a recoater blade attached to the body; and a pair of scoops attached to opposing end portions of the body with the recoater blade extending between the pair of scoops, wherein the recoater blade and the pair of scoops extend away from the body, and wherein the pair of scopes extend beyond the recoater blade. In some embodiments, an additive manufacturing system comprising the recoater assembly is described.

In a different aspect, a method for additively manufacturing a part, the method comprising moving a recoater blade across a layer of precursor material disposed on a build plate to form a build surface; and deforming one or more flexible portions of the recoater blade relative to the build surface and the other one or more flexible portions of the recoater blade over and past a feature on the build surface.

In yet a different aspect, a method for additively manufacturing a part, the method comprising moving a recoater blade across a layer of precursor material disposed on a build plate to form a build surface; accommodating thermal expansion mismatch between a recoater assembly and a motion stage the recoater assembly is attached to using a plurality of compliant attachments disposed along at least a portion of a length of a body of the recoater assembly.

In yet different aspect, a method for additively manufacturing an object, the method comprising moving a recoater blade across a layer of precursor material disposed on a build plate to form a build surface; moving a pair of scoops along opposing sides of a build surface to collect excess precursor material displaced from the build surface by the recoater blade.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

Other advantages and novel features of the present disclosure will become apparent from the following detailed description of various non-limiting embodiments of the disclosure when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 8A is a schematic illustration of a body including a scoop attached to the body via a side wall, according to some embodiments;

FIGS. 8B-8C are schematic illustrations showing various positionings of a scoop relative to the body, according to some embodiments;

DETAILED DESCRIPTION

Figure 1:
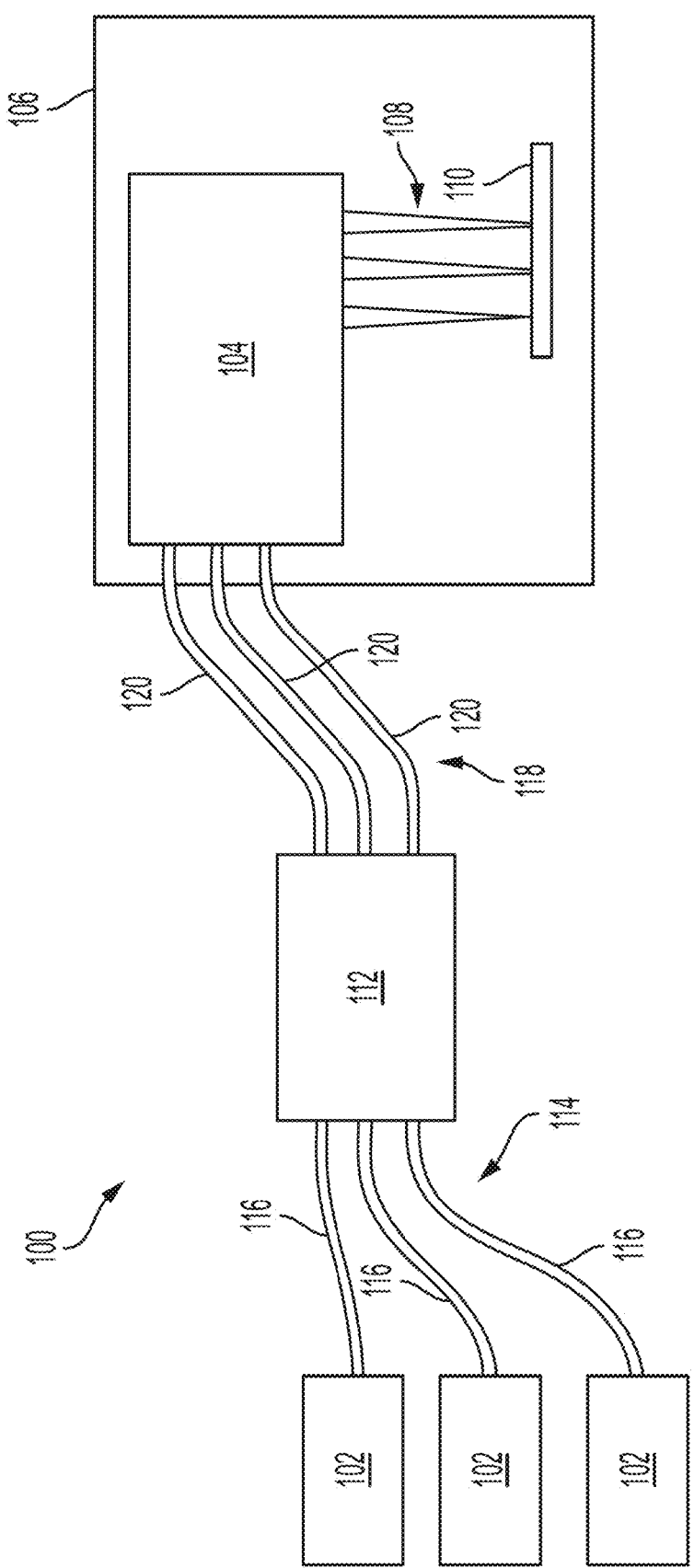
FIG. 1 shows a schematic representation of an additive manufacturing system, according to some embodiments.

Systems and methods are described below that can increase the rate of additive manufacturing, reduce the formation of recoating defects, and/or reduce precursor material losses associated with fabricating an object using an additive manufacturing system. The Inventors discovered that additive manufacturing systems can be designed to increase the ability to accommodate thermal changes as well as the compliance of recoater blades associated with the additive manufacturing systems so that the recoater blades can more readily form a desired build surface into a deposited precursor material layer during operation of an additive manufacturing system.

A recoater blade is typically moved across the build surface when a new layer of material is applied to a build plate (or a previously fabricated layer of the object). The material is typically in powder form, and the recoater blade serves to smooth the surface of the powder layer before the powder is formed into a layer (e.g., fused together with a laser or joined together with a binder). For conventional additive manufacturing systems, the recoater blade is typically a solid plate that is normal to the build surface (i.e., 90° relative to one another). For example, if a build surface is horizontal then the recoater blade would be at least partially vertical to the build surface. As the recoater blade is moved horizontally across the build surface, powder material is moved across the build surface, but, due to the at least partially vertical orientation of the recoater blade, the powder is scraped to a desired height. However, some powder material may be flung forward, pushed to the sides of the recoater blade, and/or otherwise moved into an undesired position. Additionally, in instances in which the recoater blade encounters a defect from previously formed layer, recoater blade chipping, vibrations, and/or other undesired behaviors may result in chatter, shark tooth, or other undesirable recoating defects. These and other defects may propagate through the fabricated layers and result in part defects in the overall object that may result in a defective part that does not meet the desired manufacturing tolerances.

These problems can be further exasperated by heat generated during the fabrication process. Specifically, as each layer of the object is formed, heat is generated as the powder is formed (e.g., fused) into a layer, and this heat can warp or otherwise deform the recoater blade of conventional additive manufacturing systems. For example, a recoater blade is typically made from a hard material (e.g., stainless steel), but the movement stage or carriage the recoater blade is attached to may be made from a different often softer material (e.g., aluminum). This results in thermal mismatch between the recoater blade and the structure it is attached to. Thus, when exposed to the heat in the build chamber of an additive manufacturing system, the recoater assembly, including the recoater blade, may warp due to thermal expansion mismatch between the recoater blade and associated structure it is attached to. This diminishes the ability of the recoater blade to smooth the surface of the powder material to uniformly lie within a desired plane within the focal range of the associated laser energy pixels of the system. Thus, thermal mismatch of the recoater assembly may further promote the formation and presence of non-uniformities and defects in a recoated powder layer, which, as noted above, can result in defects in the overall object during a manufacturing process.

The Inventors have recognized and appreciated that a recoater blade including separate flexible portions that are capable of deforming relative to each other along a length of the recoater blade may help to reduce flinging of powder material as the recoater blade is moved across a build surface. This may include a recoater blade formed from one or more plates including a plurality of grooves formed in the one or more plates that define the separate flexible portions that are capable of moving relative to one another and the build surface. These flexible portions may be flexible enough that as the recoater blade is moved across the build surface, the flexible portions may be deformed over and past any underlying defects and powder material rather than flinging the material or potentially damaging the recoater blade. These grooves in the recoater blade increase the compliance of the recoater assembly of the additive manufacturing system, allowing the recoater blade to more readily adapt to powder material on the build surface. In some cases, a recoater blade may include a plurality of plates including separate sets of grooves and flexible portions formed therein that are stacked together to form the recoater blade. In such an arrangement, the grooves of the separate plates may be offset from adjacent plates to avoid the presence of a straight path through the grooves of the recoater blades from the front surface of the recoater blade to the back surface of the recoater blade. In some embodiments, the recoater blade may also be angled relative to the build surface. Advantageously, having a recoater blade that is angled relative to the build surface may provide appropriate compaction of the powder layer and further reducing flinging of the powder material. Details are provided regarding such an embodiment is provided further below.

It has also been discovered that by adding compliance between the attachment of a recoater blade and a body of a recoater assembly of an additive manufacturing system warpage of the blade and recoating defects associated with temperature changes may be reduced and/or substantially eliminated. For example, a recoater blade may be connected to a body that has a plurality of compliant attachments disposed along at least a portion of a length of the body. In some embodiments, the plurality of compliant attachment may include a central compliant attachment that is relatively rigid and more compliant attachments (e.g., a first set of compliant attachments, a second set of compliant attachments) emanating from the central compliant attachment outwards towards the opposing end portions of the body and recoater blade. For example, a compliance of the compliant attachments may increase from the central portion of the recoater blade and body towards the compliant attachments positioned closest to the opposing end portions of the recoater assembly. The relative rigidity, or compliance, of the compliant attachments may be provided in any appropriate manner including by a size, thickness, material, size and shape of cutouts, or other appropriate method for controlling a compliance of an attachment for attaching a recoater blade to an overall recoater assembly as described below in more detail.

In addition to the above issues, the Inventors have recognized that as a recoater blade moves across a layer of precursor material (e.g., a metal powder, plastic powder, or other appropriate type of powder precursor material), it may displace some of this material to the sides of the recoater blade and off of the associated build surface rather than in front of the recoater blade. This generates waste material that is typically not used to fabricate the object and results in the use of more precursor material than necessarily needed to form the desired layer of precursor powder material on the build surface. Therefore, the Inventors have recognized the benefits associated with additive manufacturing systems described that include scoops that are positioned and configured to help redirect the powder material from areas outside of the build surface back towards the build surface as the recoater blade is moved across the build surface. As the recoater blade is moved across the build surface, powder material that moved to the side of the blade can be captured by the scoops so that a secondary pile of powder associated with a scoop may be pushed in front of the scoop. This secondary pile of powder may help redirect powder at the edges of the build surface back towards the build surface and/or may help to direct this excess powder towards a desired location for reuse and/or storage. These scoops may be connected to the recoater assembly of the additive manufacturing system such that the recoater blade may be positioned between two opposing scoops (e.g., a pair of scoops) disposed adjacent to opposing end portions of the recoater blade. The scoops can be sized and shaped to hold a suitable amount of powder material. For example, in some cases, the scoops have a volume suitable for collecting at least an excess amount of powder material that would be used to form a recoated layer of precursor powder material on the build surface during a recoating operation.

The above features, either alone or in combination with one another, can dramatically increase the rate of fabricating an object using additive manufacturing. For example, the complaint recoater blades may allow the recoater assembly to move faster across the build surface while avoiding undesired recoating defects such as flinging, chatter, shark tooths, and other defects. In some embodiments, the disclosed recoater assemblies may also show reduced warpage and defects associated with thermal mismatch of the recoater blades with an associated structure it is attached to through the use of compliant attachments which may be combined with the disclosed complaint recoater blades in some instances, though the use of solid recoater blades of any appropriate construction is also contemplated as the disclosure is not limited to only the disclosed compliant recoater blades. The use of scoops on opposing end portions of a recoater assembly may also help to reduce the amount of excess powder used to form a recoated layer and/or may aid in the recapture of dispensed powder material where this powder material can be reapplied to a build surface or stored for later usage. This may decrease waste generated by the additive manufacturing system. Each of these features, and other features, are described in more detail elsewhere herein. Before describing these features, an additive manufacturing system is generally described and the above features can be implemented within such a system.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows, according to some embodiments, a schematic representation of an additive manufacturing system 100, including a plurality of laser energy sources 102 that deliver laser energy to an optics assembly 104 positioned within a machine enclosure 106. For example, the machine enclosure may define a build volume in which an additive manufacturing process may be carried out. In particular, the optics assembly may direct laser energy 108 towards a build surface 110 positioned within the machine enclosure to selectively fuse powdered material on the build surface. As described in more detail below, the optics assembly 104 may include a plurality of optics defining an optical path within the optics assembly that may transform, shape, and/or direct laser energy within the optics assembly such that the laser energy is directed onto the build surface as an array of laser energy pixels. In some embodiments, the optics assembly may be movable within machine enclosure 106 to scan laser energy 108 across build surface 110 during a manufacturing process. For example, the optics assembly may be associated with appropriate actuators, rails, motors, and/or any other appropriate structure capable of optics assembly relative to the surface. Alternatively, embodiments in which the optics assembly includes galvomirrors or other appropriate components that are configured to scan the laser energy 108 across the build surface while the optics assembly is held stationary relative to the build surface are also contemplated.

In some embodiments, the additive manufacturing system 100 further includes one or more optical fiber connectors 112 positioned between the laser energy sources 102 and the optics assembly 104. As illustrated, a first plurality of optical fibers 114 may extend between the plurality of laser energy sources 102 and the optical fiber connector 112. In particular, each laser energy source 102 may be coupled to the optical fiber connector 112 via a respective optical fiber 116 of the first plurality of optical fibers 114. Similarly, a second plurality of optical fibers 118 extends between the optical fiber connector 112 and the optics assembly 104. Each optical fiber 116 of the first plurality of optical fibers 114 is coupled to a corresponding optical fiber 120 of the second plurality of optical fibers 118 within the optical fiber connector. In this manner, laser energy from each of the laser energy sources 102 is delivered to the optics assembly 104 such that laser energy 108 can be directed onto the build surface 110 during an additive manufacturing process (i.e., a build process). Of course other methods of connecting the laser energy sources 100 due to the optics assembly 104 are also contemplated.

Figure 2:
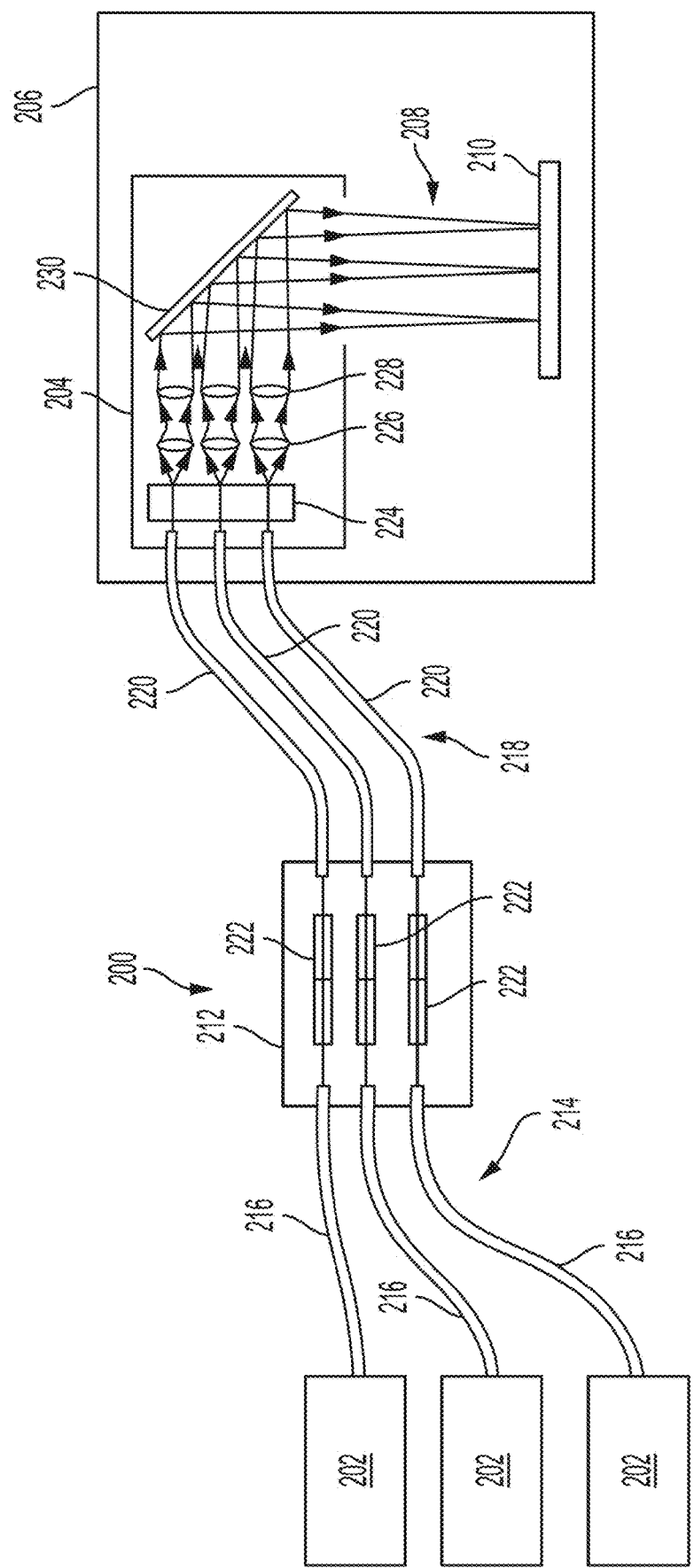
FIG. 2 shows the optical paths present in an additive manufacturing system, according to some embodiments.

FIG. 2 shows a schematic representation of another embodiment of an additive manufacturing system 200. Similar to the embodiment discussed above in connection with FIG. 1, the additive manufacturing system 200 includes a plurality of laser energy sources 202 coupled to the optics assembly 204 within the machine enclosure 206 via the optical fiber connector 212. The first plurality of optical fibers 214 extends between the laser energy sources 202 and the optical fiber connector 212, and the second plurality of optical fibers 218 extends between the optical fiber connector 212 and optics assembly 204. In particular, each optical fiber 216 of the first plurality of optical fibers is coupled to a laser energy source 202 and corresponding optical fiber 220 of the second plurality of optical fibers 218. In the depicted embodiment, optical fibers 216 are coupled to corresponding optical fibers 220 via fusion splices 222 within the optical fiber connector 212. However, embodiments, in which the optical fibers positioned within the connector are optically coupled using other types of connections and/or single continuous optical fibers are used are also envisioned.

In the depicted embodiment, the optical fibers 220 of the second plurality of optical fibers 218 are optically coupled to an optics assembly 204 of the system. For example, an alignment fixture 224 is configured to define a desired spatial distribution of the optical fibers used to direct laser energy into the optics assembly. For example, the alignment fixture may comprise a block having a plurality of v-grooves or holes in which the optical fibers may be positioned and coupled to in order to accurately position the optical fibers within the system.

FIG. 2 also depicts exemplary optics that are optically coupled to and positioned downstream from the second plurality of optical fibers 218. The various optics included in the optics assembly may be configured to direct laser energy 208 from the second plurality of optical fibers 218 on the build surface 210 to form a desired array pattern of laser energy pixels on the build surface. For example, the optics assembly may include beam forming optics such as lenses 226 and 228 (which may be individual lenses, lens arrays, and/or combined macrolenses), mirrors 230, and/or any other appropriate type of optics disposed along the various optical paths between the optical fibers and the build surface 210 which may shape and direct the laser energy within the optics assembly. Once appropriately sized and shaped, the laser energy 208 may be directed onto the build surface 210 either through direct transmission and/or using a light directing element such as the depicted mirror 230.

Figure 3:
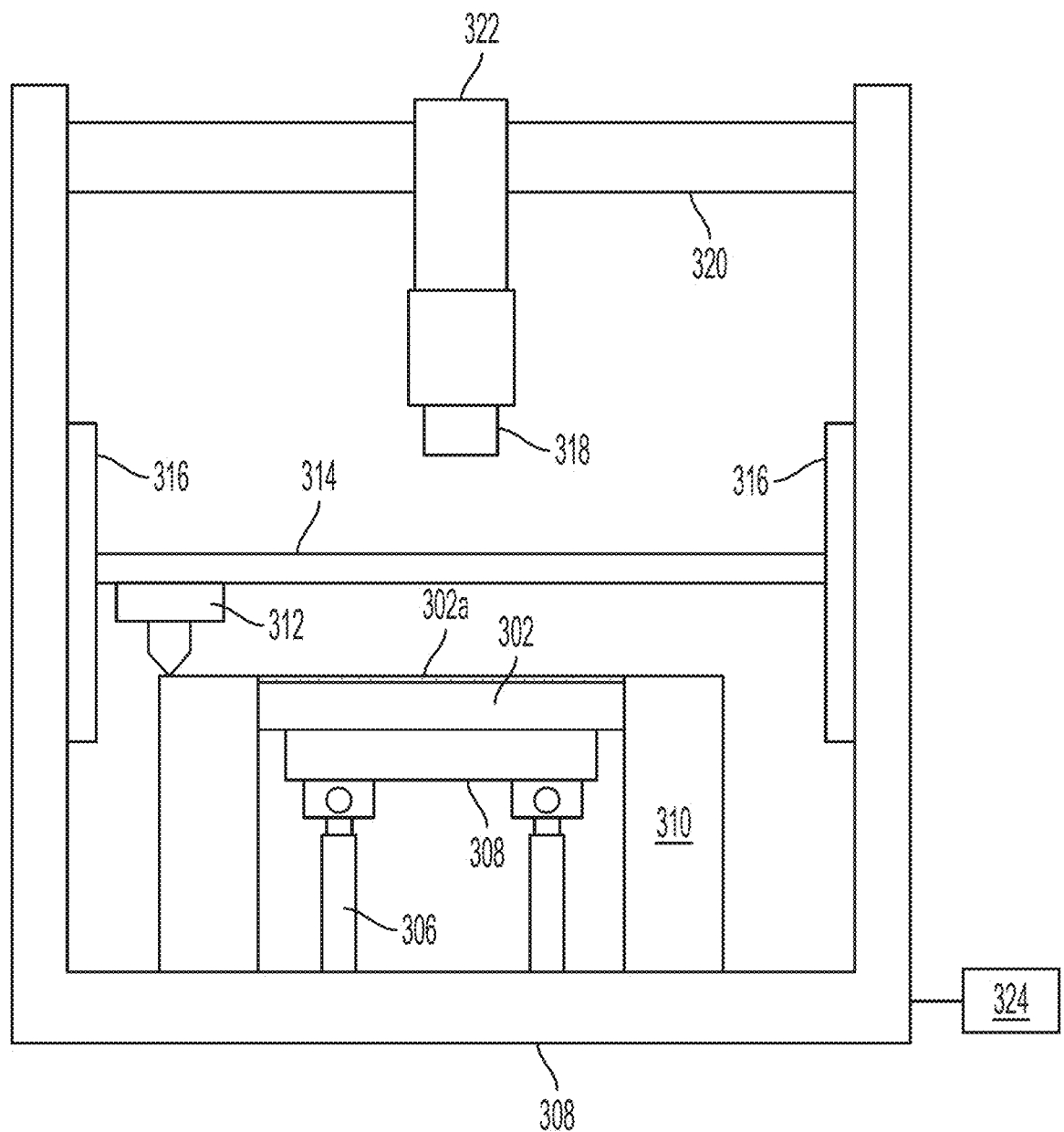
FIG. 3 shows an additive manufacturing system, according to some embodiments.

FIG. 3 depicts one embodiment of an additive manufacturing system at the beginning of a build process. The additive manufacturing system includes a build plate 302 mounted on a fixed plate 304, which is in turn mounted on one or more vertical supports 306 that attach to a base 308 of the additive manufacturing system. In the depicted embodiment, the one or more vertical supports may correspond to one, two, and/or any other appropriate number of supports configured to support the build plate, and the corresponding build surface, at a desired position and orientation. For example, the supports depicted in the figure may correspond to one or more vertical motion stages configured to control a vertical position and orientation of the build plate. A powder containment shroud 310 may at least partially, and in some embodiments completely, surround a perimeter of the build plate 302 to support a volume of precursor material 302a, such as a volume of powder, disposed on the build plate and contained within the shroud. The shroud may be supported on the base 308 or by any other appropriate portion of the system.

The additive manufacturing system may include a powder deposition system in the form of a recoater assembly 312 that is mounted on a horizontal motion stage 314 that allows the recoater blade to be moved back and forth across either a portion, or entire, surface of the build plate 302. As the recoater assembly traversers the build surface of the build plate (or a previously manufactured layer of the object), it deposits a precursor material 302a, such as a powder, onto the build plate. The recoater blade of the recoater assembly, detailed further below, is scraped across a surface of the deposited layer of precursor material to smooth the surface to lie substantially within a desired reference plane to provide a layer of precursor material with a predetermined thickness on top of the underlying volume of fused and/or unfused precursor material deposited on the build plate during prior formation steps.

In some embodiments, the supports 306 of the build plate 302 may be used to index the build surface of the build plate 302 in a vertical downwards direction relative to a local direction of gravity. In such an embodiment, the recoater 312 may be held vertically stationary for dispensing precursor material 302a, such as a precursor powder, onto the exposed build surface of the build plate as the recoater is moved across the build plate each time the build plate is indexed downwards.

In some embodiments, the additive manufacturing system may also include an optics assembly 318 that is supported vertically above and oriented towards the build plate 302. As detailed above, the optics assembly may be optically coupled to one or more laser energy sources, not depicted, to direct laser energy in the form or one or more laser energy pixels onto the build surface of the build plate 302. To facilitate movement of the laser energy pixels across the build surface, the optics assembly may be configured to move in one, two, or any number of directions in a plane parallel to the build surface of the build plate. To provide this functionality, the optics assembly may be mounted on a gantry 320, or other actuated structure, that allows the optics unit to be scanned in plane parallel to the build surface of the build plate.

In the above embodiment, the build plate is indexed vertically while the remaining active portions of the system are held vertically stationary. However, embodiments, in which the build plate is held vertically stationary and the shroud 310, recoater 312, and optics assembly 318 are indexed vertically upwards relative to a local direction of gravity during formation of successive layers are also contemplated. In such an embodiment, the recoater horizontal motion stage 314 may be supported by vertical motion stages 316 that are configured to provide vertical movement of the recoater relative to the build plate. Corresponding vertical motion stages may also be provided for the shroud 310, not depicted, to index the shroud vertically upward relative to the build plate in such an embodiment. In some embodiments, the additive manufacturing system may also include an optics assembly 318 that is supported on a vertical motion stage 320 that is in turn mounted on the gantry 320 that allows the optics unit to be scanned in the plane of the build plate 302.

In the above embodiment, the vertical motion stages, horizontal motion stages, and gantry may correspond to any appropriate type of system that is configured to provide the desired vertical and/or horizontal motion. This may include supporting structures such as: rails; linear bearings, wheels, threaded shafts, and/or any other appropriate structure capable of supporting the various components during the desired movement. Movement of the components may also be provided using any appropriate type of actuator including, but not limited to, electric motors, stepper motors, hydraulic actuators, pneumatic actuators, electric actuators, and/or any other appropriate type of actuator as the disclosure is not so limited.

In addition to the above, in some embodiments, the depicted additive manufacturing system may include one or more controllers 324 that is operatively coupled to the various actively controlled components of the additive manufacturing system. For example, the one or more controllers may be operatively coupled to the one or more supports 306, recoater 312, optics assembly 318, the various motion stages, and/or any other appropriate component of the system. In some embodiments, the controller may include one or more processors and associated non-transitory computer readable memory. The non-transitory computer readable memory may include processor executable instructions that when executed by the one or more processors cause the additive manufacturing system to perform any of the methods disclosed herein.

Turning specifically to the recoater assembly of the additive manufacturing system, FIG. 4 shows a schematic illustration of a plate that can be used as a part of a recoater blade for a recoater assembly. In FIG. 4A, a plate 410 comprise a plurality of grooves 420 formed in the plate 410. The plurality of grooves are distributed along at least a portion, and in some instances substantially all of a length of the plate, and may extend from a first portion of the plate which may be adjacent to a first edge of the plate 410 to a second edge opposite the first edge. Thus, the grooves may extend partially across a width of the recoater blade that is perpendicular to the length (e.g., a long axis) of the plate. Depending on the embodiment, the grooves may either extend parallel to the width direction of the plate or the grooves may be angled to the width direction as the disclosure is not so limited. The plurality of grooves 420 forms a corresponding plurality of separate flexible portions that are more flexible than the bulk of the plate and are able to flex around living hinges formed between the flexible portions and the corresponding portion of the plate the flexible portions are attached to due, at least in part, to the plurality of grooves 420 formed in the plate. Thus, these flexible portions of the blade may be distributed along at least a portion of the length of the plate, and may be configured to elastically deform when a force is applied to the flexible portions in a direction that is out of plane with the plate. This may help to provide separate flexible portions of the recoater blade that are capable of deforming over and past obstacles as a recoater assembly is moved across a build surface.

Figure 4A:
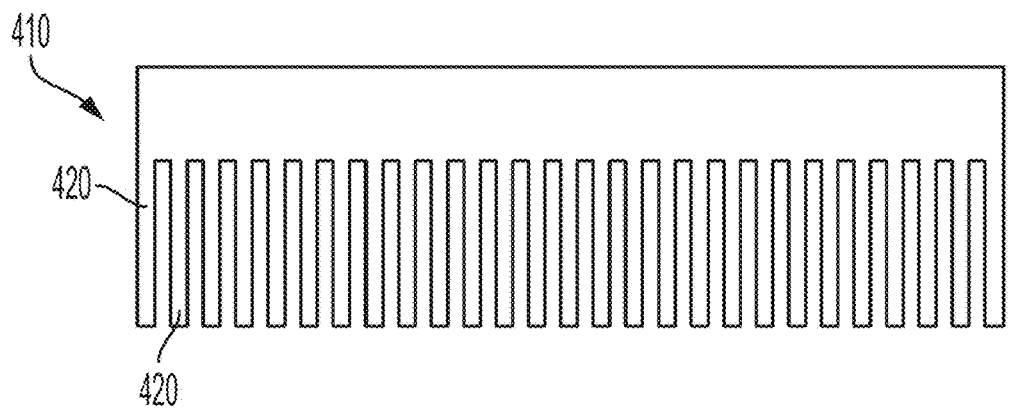
FIG. 4A is a schematic depiction of a plate comprising a plurality of grooves extending from a first edge of the plate towards a second edge opposite the first edge, according to some embodiments.
Figure 4B:
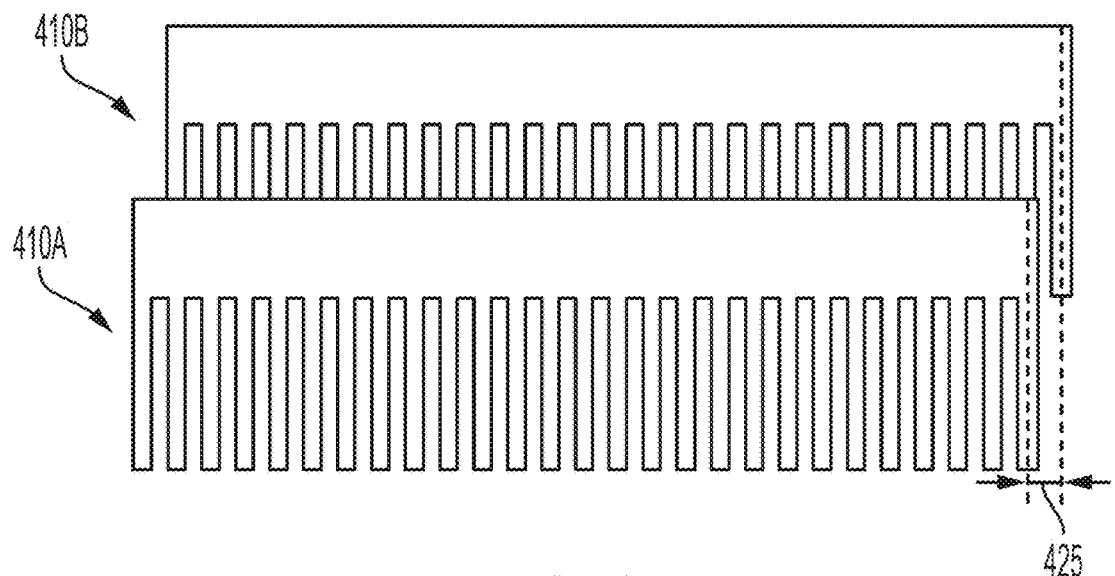
FIG. 4B schematically depicts two plates of a plurality of plates showing an offset distance between the plurality of grooves of each plate, according to some embodiments.

In some embodiment, a recoater blade of a recoater assembly comprises a plurality of plates (e.g., two plates, three plates, four plates) that may be disposed on one another to form a stack of plates that function as a composite recoater blade. By way of illustration, FIG. 4B depicts an embodiment with two plates, plates 410A and 410B, each plate comprising a plurality of grooves formed in the plates. When a plurality of plates is used, the grooves of each plate may be offset from the grooves formed in adjacent plates. For example, FIG. 4B depicts an embodiment in which the grooves of plates 410A and 410B are offset by a distance 425 relative to one another such that the grooves formed in adjacent plates may be at least partially overlapped with a solid flexible portion of an adjacent plate, or more preferably fully overlapped. In some embodiments, more than two plates are present, and each plate of the plurality of plates may be offset as desired, in view of this disclosure.

Figure 4C:
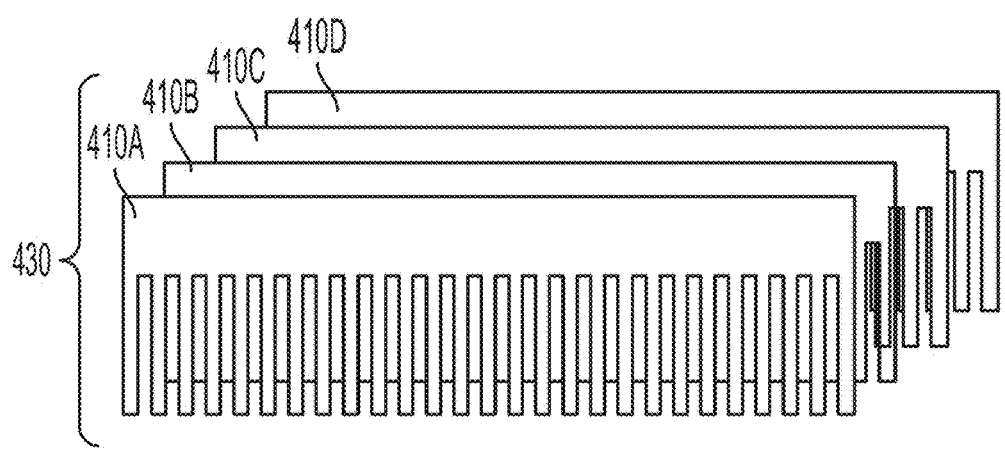
FIG. 4C schematically illustrates a plurality of plates including four plates, each of the four plates comprising its own plurality of grooves, according to some embodiments.
Figure 4D:
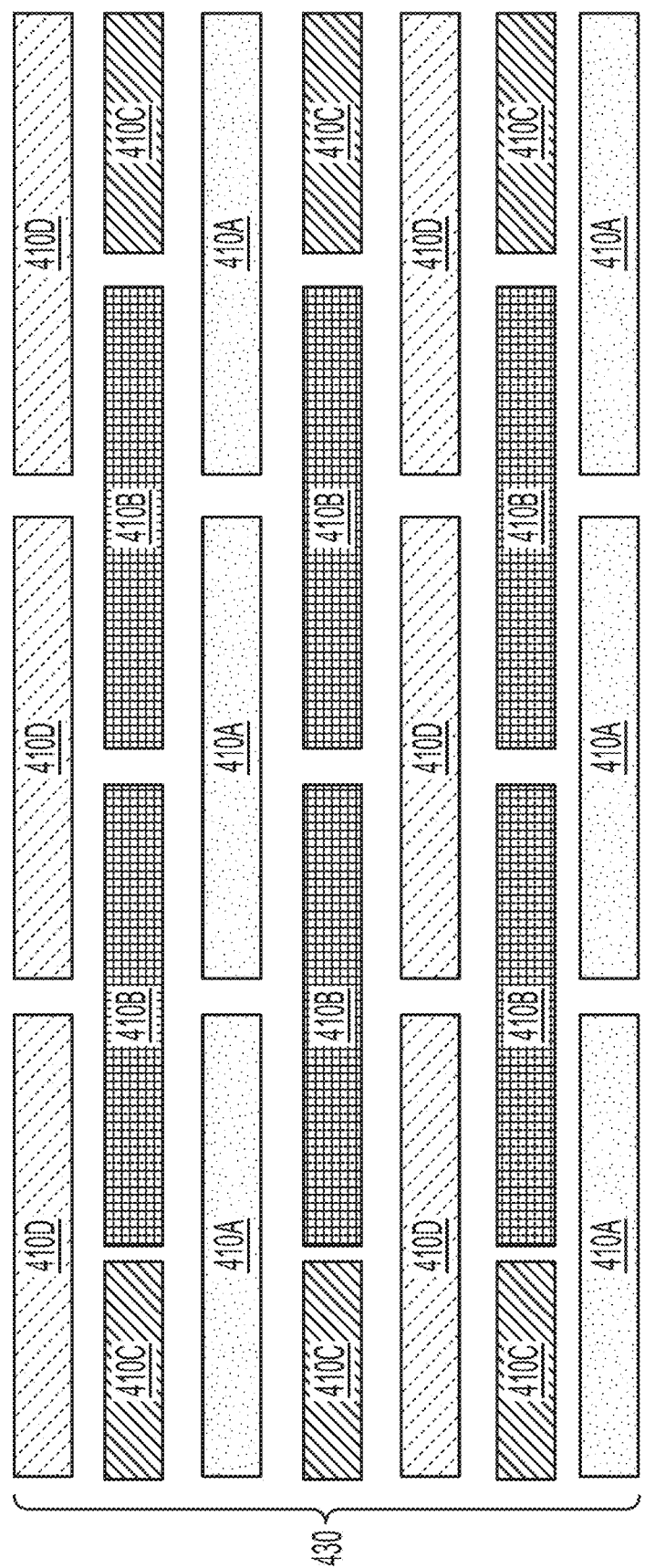
FIG. 4D is a schematic top view of the plurality of blades depicted in FIG. 4C showing how each of the four plates can be staggered relative to one another, according to some embodiments.

FIG. 4C schematically illustrates an embodiment with more than two plates for the recoater blade. The plurality of plates 430 includes plates 410A, 410B, 410C, and 410D. Each of these plates includes a plurality of grooves extending from one edge of the plate to another, opposing edge. FIG. 4D shows a top view of the embodiment shown in FIG. 4C and depicts how the grooves of one plate can be staggered relative to the grooves of another plate. Thus, the at least partially overlapping grooves and flexible portions of the separate plates may be arranged avoid the presence of passages that extend through the stack of plates forming a recoater blade which may help to avoid the passage of a precursor material, e.g., a powder, through the recoater blade during a scraping process.

Figure 5:
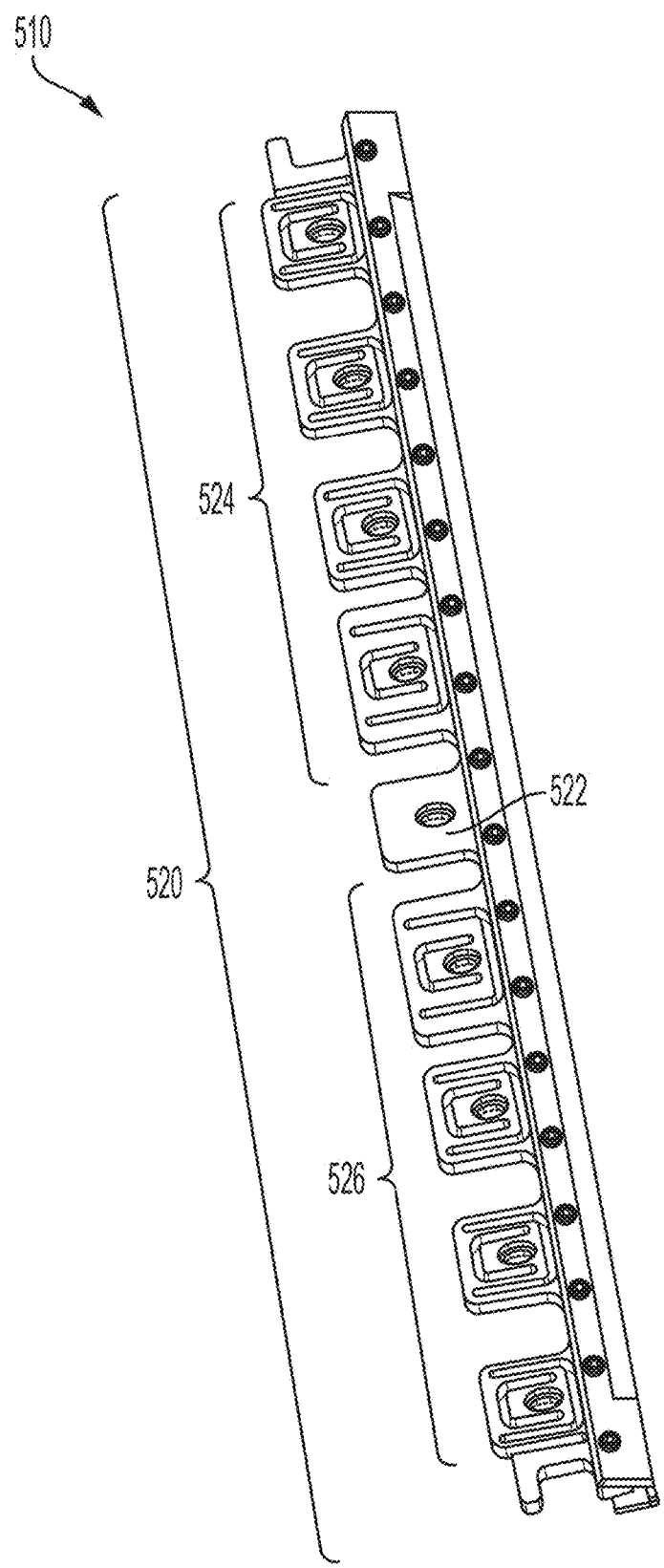
FIG. 5 is an illustrative depiction of a body of a recoater assembly comprising a plurality of compliant attachments that includes a central compliant attachment, a first set of compliant attachments disposed on a first side of the central compliant attachment, and a second set of compliant attachments disposed on a second side of the central compliant attachment opposite from the first side, according to some embodiments.

Alternatively or additionally to the above-described compliant recoater blades, other features of the additive manufacturing system can provide improved performance of a recoater assembly. For example, as noted previously, a recoater assembly may include features to help mitigate, or eliminate, the effects of thermal expansion mismatch in a recoater assembly. FIG. 5 illustrates a schematic diagram of a recoater assembly including a body configured to provide compliance to the attachments of the recoater assembly to the associated motion stage or other appropriate portion of an additive manufacturing system. In this figure, a body 510 of a recoater assembly is illustrated. The body 510 includes a plurality of compliant attachments 520, including an optional central compliant attachment 522, a first set of compliant attachments 524 on a first side of the central compliant attachment, and a second set of compliant attachments 526 on a second opposing side of the central compliant attachment. The body and/or compliant attachments may be configured such that the compliance (e.g., a flexibility of the compliant attachments to an applied force) increases moving from a central portion (e.g., the central compliant attachment) towards the end portions of the body along a length of the body. This may be accomplished in a variety of suitable ways. One such manner in which compliance of the body increases moving from the center towards the ends of the length of the body is to have each compliant attachment occupy about the same overall volume but to have less material for more compliant attachments. In some cases, this is achieved using different size attachments (e.g., different widths, lengths, and/or thicknesses), different size cutouts to form a living hinge or other flexible structure on the attachments, different materials with different compliances, combinations of the forgoing, and/or any other method of providing attachments with different compliances along the length of the body. For example, the illustrated embodiment corresponds to tabs extending outwards from the body with bolt holes formed therein and cutouts formed in a pattern on each tab to provide the desired flexibility with the cutouts not being formed in the central tab. The overall size of the tabs and cutouts are controlled to provide the desired variation in compliance. Assuming that each of the compliant attachments is fabricated from the same material, this results in less rigid compliant attachments towards the center portion of the body and more compliant attachments towards the end portions of the body. Of course, other techniques for providing a desired degree of compliance are possible and are described in more detail elsewhere here.

In addition to the bolt holes shown in the depicted embodiment, it should be understood that any appropriate type of attachment may be used to attach the recoater assembly to an associated motion stage or other structure of an additive manufacturing system including, but not limited to, surfaces for welding, surfaces for brazing, clamps, mechanically interfering features that interlock with corresponding features on another structure, adhesives, and/or any other method of attaching a compliant attachment to another structure as the disclosure is not limited in this fashion.

Figure 6A:
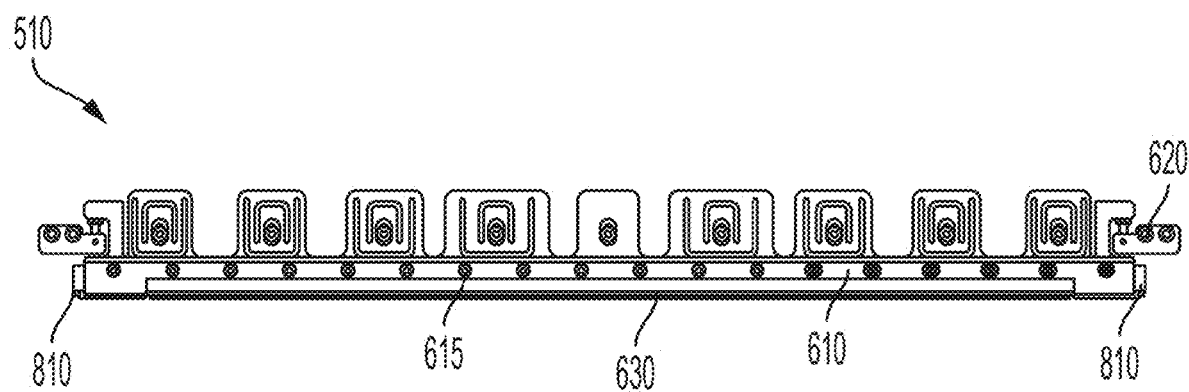
FIG. 6A schematically depicts the body of a recoater assembly with a leveling mount attached to the body, according to some embodiments.
Figure 6B:
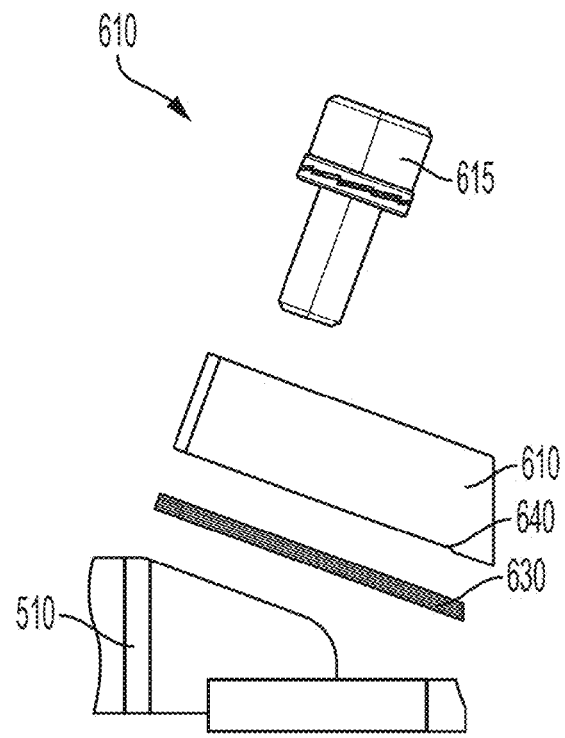
FIG. 6B is an exploded view of a clamp used as a leveling mount for a compliant recoater blade, according to some embodiments.

The body of the recoater assembly may comprise components or features for connecting the compliant recoater blade or other components to the additive manufacturing system. For example, in some embodiments the recoater assembly comprises a clamp 610 that is configured to attach the recoater blade 630 to the body 510 of the recoater assembly. FIG. 6B shows an exploded view of the clamp 610. The clamp is attached to the body 510 using a plurality of bolts 615, or other appropriate type of attachment (e.g., clamps, mechanically interlocking features, etc.) to compress and hold the separate plates of the recoater blade, or an integral recoater blade, between the clamp and body. In some embodiments, the bolts may pass through holes formed in the recoater blade as well. In this figure, the recoater assembly includes a leveling mount 620, which may be provided as two separate leveling screws or other vertically adjustable structure on opposing end portions of the recoater assembly. The leveling mount can be used to adjust a vertical position and/or orientation of the recoater blade relative to a structure the recoater assembly is attached to and/or the associated build plate and build surface. Details regarding the level assembly are provided further below, but this leveling mount. In this figure, the body also comprises a rounded portion adjacent to the attached compliant recoater blade 630 and opposite from the clamp. Thus, when deformed during operation, the recoater blade may deflect in a direction that bends the separate flexible portions against this rounded surface which may help avoid stress concentrations associated with deformation against a sharp point or corner.

In some embodiments, it may be desirable to apply a preload to a flexible recoater blade to help reduce the incidence of flinging of powder on a build surface during a scraping operation of the recoater blade across the build surface. In some embodiments, this preload may correspond to a force that is applied at least partially in a direction that is out of plane with the recoater blade and is oriented in a direction that is opposite from a direction of motion of the recoater blade across the build surface during a recoating in scraping operation. In one such embodiment, as shown in FIG. 6B, the clamp 610, or other appropriate structure in contact with the recoater blade, may include a protrusion 640 that extends outwards from an inner surface of the clamp towards the adjacent recoater blade 630. When in the clamped configuration, an upper portion of the inner surface may compress the recoater blade against the corresponding body 510. The protrusion may be pressed against an unsupported portion of the recoater blade extending out from the body such that the protrusion causes the unsupported portion of the recoater blade to deflect in the rearward direction of the recoater assembly opposite a direction of motion of the recoater assembly during a scraping operation. This deflection of the recoater blade may result in the above noted preload being applied to the recoater blade. Again, this preload may help to avoid undesired deflection of the recoater blade during a scraping operation due to relatively small forces being applied. Instead, the recoater blade may substantially resist deflection until a force greater than a threshold force is applied to the recoater blade causing the recoater blade, or in some instances the separate flexible portions of the recoater blade, to deflect over and past and associated feature on the build surface. In some embodiments, the unsupported end portions of the endplates of the recoater blade 630 may be appropriately sized and shaped to be aligned in a common plane that is substantially parallel to a desired reference plane of the build surface. In other words, the separate plates may be slightly different lengths such that the leading edge of the recoater blade may either be the lowest vertical edge of the recoater blade and/or may lie in a common plane as the lower edges of the other plates of the recoater blade.

Figure 7A:
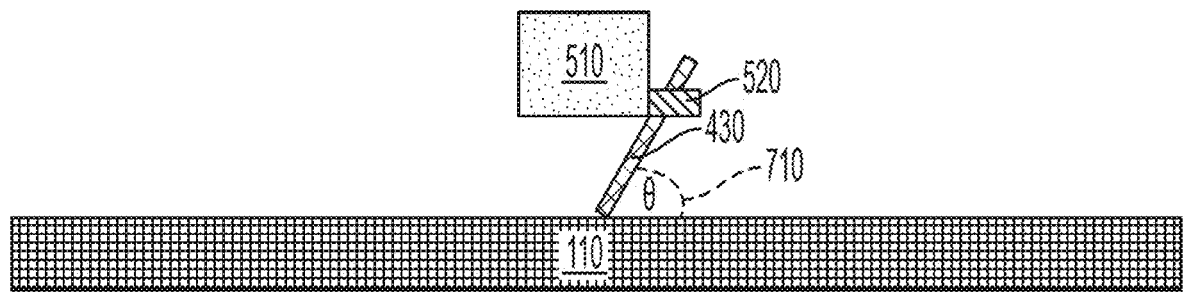
FIG. 7A is a schematic diagram showing an angle of the recoater blade relative to the body and relative to a build surface, according to some embodiments.
Figure 7B:
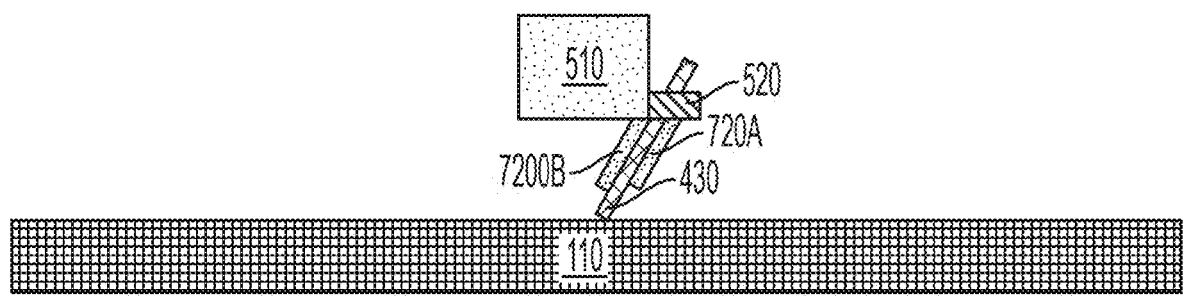
FIG. 7B is a schematic diagram showing the recoater blade supported by a backing including a front portion and a back portion and attached to the body of a recoater assembly, according to some embodiments.

For some embodiments, the recoater blade is angled relative to a build surface. By way of example, FIG. 7A shows a cross-sectional side perspective of a recoater assembly including a recoater blade that is angled relative to a build surface. In this figure, the recoater blade 430 is angled at an angle 710 relative to normal surface of the build surface 110. As was described above, angling of the recoater blade relative to the build plate or build surface can reduce or minimize flinging of a powder material (e.g., a powder) as the recoater blade moves across the build surface. The recoater assembly may also include backing for the recoater blade, such as the backing 720 showing in the figure. The backing 720 may include a front portion 720A and a back portion 720B.

Figure 7C:
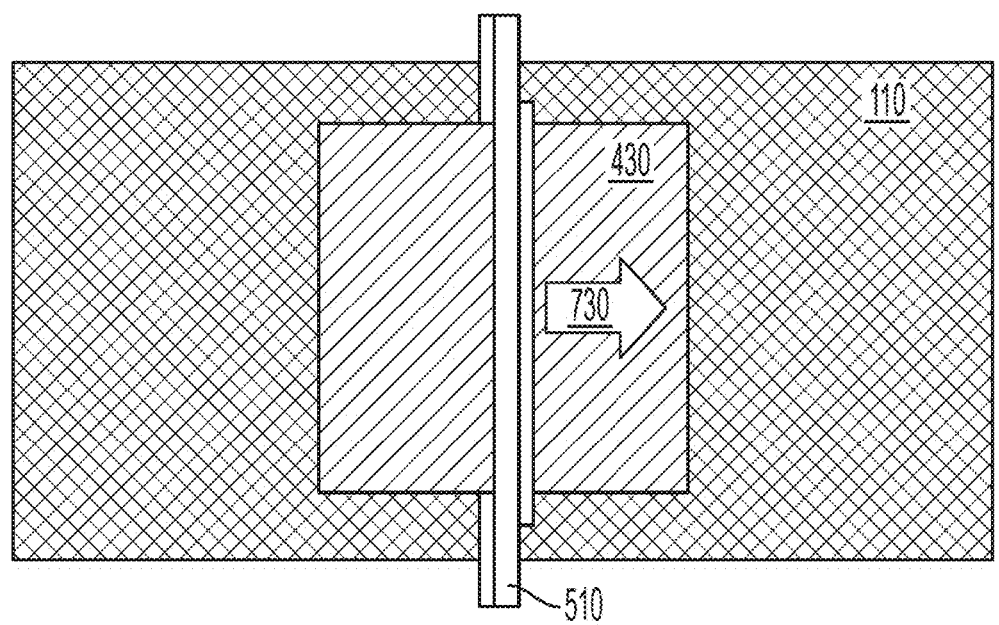
FIG. 7C is a schematic top view of a recoater blade moving across a build surface along a particular direction of motion, according to some embodiments.

FIG. 7C schematically illustrates a top view of the recoater assembly including body 510 relative to the build surface 110 of an additive manufacturing system during a recoating and scraping operation. The attached recoater blade 530 can then move in a direction of motion 730 across the build surface 110. Thus, in the illustrated embodiment, the recoater blade may be angled relative to the build surface such that it extends at least partially in a direction that is opposite a direction of motion of the recoater assembly during a recoating in scraping operation.

As noted above, the movement of a recoater blade across a build surface may cause excess precursor material to be pushed outwards towards the edges, and in some instances beyond the edges, of a build plate and the layer of material disposed thereon. Thus, it may be desirable to limit this outward motion of precursor material, as well as appropriate handling of this material, to help minimize the need for excess powder during a recoating and scraping operation as well as the potential reuse of this material. Thus, in some embodiments, the recoater assembly comprises scoops (e.g., a pair of scoops) configured to collect and guide powder moved to the sides of the recoater blade. For example, in FIGS. 6A and 8A-8C, one or more scoops 810, e.g., a pair of scoops, may be attached to opposing portions of the body 510 of the recoater assembly. This may include positioning the scoops on opposing end portions of the recoater blade 630 though in some instances a length of the scoops may partially overlap and extend past the end of the recoater blade along the length of the recoater assembly. FIGS. 8A and 8C illustrate the recoater assembly without the clamp and recoater blade to help better illustrate the relative positioning of the scoops on the assembly.

Figure 8D:
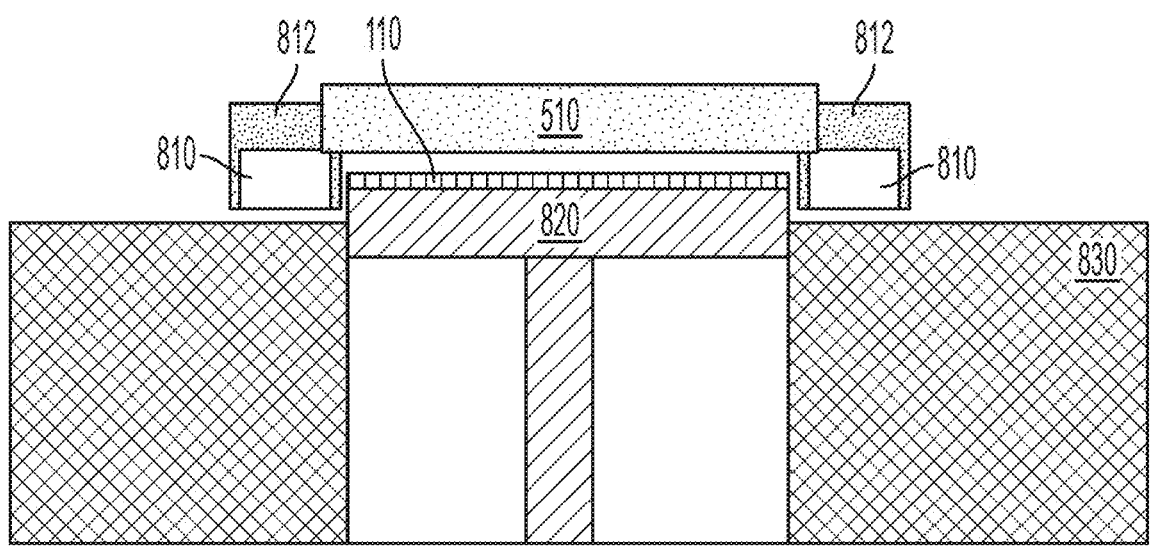
FIG. 8D is a schematic diagram showing a pair of scoops located below a build surface that has been raised above the pair of scoops and a surrounding surface by a vertical movement stage, according to some embodiments.

The one or more scoops may also be positioned to collected powder (or some other precursor material) that has been displaced past a side of a build plate and/or build surface. For example, as best shown in FIG. 8B, the scoop may be positioned such that a lower edge of the scoop oriented vertically downwards relative to a position of the build surface adjacent to the recoater blade during a recoating and scraping operation may extend past a lower edge of the recoater blade. However, in other embodiments, the scoop may have a different position relative to the body including, for example, a position in which a lower edge of the scoops are aligned with a lower edge of the recoater blade. For illustration, FIGS. 8C and FIG. 8D show a pair of scoops 810 formed in scoop bodies 812 that are attached to opposing end portions of the of the body 510. As depicted in FIG. 8D, in some embodiments a build surface 110 corresponding to a layer of precursor material disposed on a build plate, either directly or with one or more intermediate layers disposed thereon, can be supported by a vertical stage 820 which may correspond to one or more pistons, rails, or other structure associated with one or more electrical, hydraulic, pneumatic, or other appropriate actuator capable of controlling a vertical position of the build surface.

As illustrated in the figure, the build surface may be positioned above a surrounding platform 830 such that the build surface is positioned closer to the recoater assembly than the surrounding platform. In this manner, the pair of scoops 810 can be extend from below the build surface to above the build surface on either side of the build surface. Thus, moving the pair of scoops along opposing sides of a build surface may collect excess powder that is displaced from the build surface onto the surrounding platform by the recoater blade. As described previously, this may also permit the scoops to redirect the powder towards an interior of the build surface. This redirection of the powder, may help resist the motion of precursor material off of the build surface as the recoater blade moves in a direction of motion across the build surface 110 which may help reduce the need for excess precursor material. To help reduce disturbances of the build layer, the scoops may be offset from an edge of an adjacent portion of the build surface during a recoating and scraping operation by an appropriate length that may be determined based on appropriate parameters such as layer thickness, build surface size, and/or any other appropriate parameter. The scoops may have a volume that is appropriately sized to receive and guide an expected volume of excess precursor material that is dispensed by the recoater assembly. Thus, the one or more scoops may guide the received precursor material towards an appropriate location such as a powder hopper opening or other appropriate volume intended to temporarily hold, recycle the powder into the system, or otherwise handle the precursor material as the disclosure is not limited in how the powder is handled after being guided to a desired location by the scoops.

Additional details regarding various features described above are provided below.

As noted above, in some embodiments, a recoater assembly comprises a plurality of plates, wherein at least one plate of the plurality of plates comprises a plurality of grooves. These grooves may extend from a first portion of a plate which may include a first edge of the plate towards a second edge opposite the first edge. The plurality of grooves are arranged along a length of the plate and form separate, flexible portions within the plate. The length of the plurality of grooves can vary, for example, to adjust to a grain size of a powder material (e.g., disposed on a build surface) that the recoater blade moves across. In one embodiments, the length of the plurality of grooves is 10.5 mm across the width of a plate. In some embodiments, a dimension (e.g., a length) that the plurality of grooves extends across a width of the plate may be greater than equal to 1 mm, greater than or equal to 3 mm, greater than or equal to 5 mm, greater than or equal to 10 mm, greater than or equal to 15 mm, greater than or equal to 20 mm, greater than or equal to 25 mm, or greater than or equal to 30 mm. In some embodiments, a dimension that the plurality of grooves extends across a width of the plate is less than or equal to 30 mm, less than or equal to 25 mm, less than or equal to 20 mm, less than or equal to 15 mm, less than or equal to 10 mm, less than or equal to 5 mm, less than or equal to 3 mm, or less than or equal to 1 mm. Combinations of the foregoing range are also possible (e.g., greater than or equal to 15 mm and less than or equal to 30 mm). Other ranges are possible.

The plurality of grooves may form a particular number of flexible portions which may take any appropriate linear or non-linear shape (e.g., protrusions, fingers, comb like extensions, tabs, teeth, etc.). In some embodiments, the plurality of grooves forms at least 3 flexible portions, at least 5 flexible portions, at least 10 flexible portions, at least 20 flexible portions, at least 25 flexible portions, at least 30 flexible portions, or more. Of course, the plurality of grooves may form a number of flexible portions that are no greater than 50, no greater than 30, no greater than 25, no greater than 20, no greater than 10, no greater than 5, no greater than 3 flexible portions formed by the plurality of grooves). Combinations are also contemplated (e.g., at least 10 flexible portions and no greater than 50 flexible portions, at least 10 flexible portions and no greater than 30 flexible portions, etc.). Other ranges are possible as this disclosure is not so limited.

When a flexible portion of a plate is engaged (e.g., a first flexible portion is deflected on a first plate), other adjacent flexible portions included in plates located behind the first plate relative to a direction of travel of the recoater blade (e.g., a second portion) may also be engaged (e.g., deflected). For example, when a first flexible portion is engaged (e.g., deflected backwards), it may cause a cascading deflection of adjacent flexible portions included in plates behind it (e.g., a second portion of flexible portions). In some embodiments, this may result in an increasing number of flexible portions being engaged in each sequentially located layer when the flexible recoater blade is elastically deformed (e.g., triangular propagation). In some embodiments, when a first portion of flexible portions is engaged, at least 5, at least 10, at least 20, at least 25, or at least 30 other adjacent flexible portions in other plates positioned behind the first plate may also engaged (e.g., by cascading deflection from the first portion). Of course, in some embodiment, no greater than 30, no greater than 25, no greater than 20, no greater than 10, or no greater than 5 adjacent flexible portions are also engaged when a first flexible portion is engaged. Combinations of the foregoing range are also contemplated (e.g., at least 5 and no greater than 25 flexible portions of a second portion are deflected when a first portion of flexible portions is engaged). Other ranges are possible as the size, number, and positioning of flexible portions and plates may be varied depending on the desired application.

As used herein, when a flexible portion (or some other component) is referred to as being "adjacent" to another flexible portion, it can be directly adjacent to the other flexible portion, or one or more intervening components (e.g., flexible portions) also may be present. A flexible portion that is "directly adjacent" to another flexible portion (or some other component) means that no intervening component is present.

The plate that the plurality of grooves is formed into may generally have dimensions suitable for use as a recoater blade and for forming the plurality of grooves therein. For example, a plate can be sized 50 mm×150 mm, and the plurality of grooves can extend 20 mm along the width of this exemplary plate. The groove-to-groove distances may be uniform across the length of the one or more plates (although these distances can be varied) and may be sized to form a plurality of separate, flexible portions. These separate, flexible portions provide a degree of compliance to the plate relative to plate with no grooves formed into it. In some embodiments, a dimension (e.g., a length) of the plate is greater than or equal to 100 mm, greater than or equal to 150 mm, or greater than or equal to 200 mm. In some embodiments, a dimension of the plate is less than or equal to 1000 mm, less than or equal to 500 mm, less than or equal to 200 mm, less than or equal to 100 mm, less than or equal to 50 mm, or other appropriate dimension. Combinations of the foregoing ranges are also contemplated (e.g., greater than or equal to 100 mm and less than or equal to 50 mm). Other ranges are possible. A corresponding width of the plate that is perpendicular to a length of the plate may be appropriate sized to accommodate and support the lengths of the grooves and corresponding flexible portions formed in the plate.

The plates (e.g., one or more plates, a plurality of plates, flexible portions of the plate) may each have any suitable thickness (e.g., a dimension perpendicular to the width and the length directions). In some embodiments, a thickness of a plate is greater than or equal to 0.25 mm, greater than or equal to 0.5 mm, greater than or equal to 0.75 mm, or greater than or equal to 1 mm. In some embodiments, a thickness of a plate is less than or equal to 1 mm, less than or equal 0.75 mm, less than or equal to 0.5 mm, or less than or equal to 0.25 mm. Combinations of the foregoing ranges are also contemplated (e.g., greater than or equal to 0.25 mm and less than or equal to 1 mm). Other ranges are possible as this disclosure is not so limiting.

In some embodiments, a groove-to-groove spacing defines a dimension of a flexible portion formed by the plurality of grooves. The groove-to-groove spacing corresponds to a dimension of the flexible portions formed by the plurality of grooves. For some embodiments, the groove-to-groove spacing is greater than or equal to 0.1 mm, greater than or equal to 0.3 mm, greater than or equal to 0.5 mm, greater than or equal to 0.7 mm, greater than or equal to 1 mm, greater than or equal 1.3 mm, greater than or equal to 1.5 mm, greater than or equal to 1.7 mm, or greater than or equal to 2 mm. For some embodiments, the groove-to-groove spacing is less than or equal to 2 mm, less than or equal to 1.7 mm, less than or equal to 1.5 mm, less than or equal to 1.3 mm, less than or equal to 1 mm, less than or equal to 0.7 mm, less than or equal to 0.5 mm, less than or equal to 0.3 mm, or less than or equal to 0.1 mm. Combinations of the foregoing ranges are also possible (e.g., greater than or equal to 0.5 mm and less than or equal to 1.5 mm). Other ranges are possible.

The spacing between each flexible portion formed by the groove of the plurality of grooves, which may also correspond to a width of the grooves extending through the one or more plates, may be relatively small relative to the dimensions of the plate. For example, for a 50 mm×150 mm sized plate, the distance between flexible portions (i.e., width of the groove itself) along the 150 mm length of the plate can be less than 1 mm (e.g., less than 0.1 mm). In some embodiments, the distance between each flexible portion is less than or equal to 1 mm, less than or equal to 0.1 mm, less than or equal to 0.09 mm, less than or equal to 0.08 mm, less than or equal to 0.07 mm, less than or equal to 0.06 mm, less than or equal to 0.05 mm, less than or equal to 0.04 mm, less than or equal 0.03 mm, less than or equal to 0.02 mm, or less than or equal to 0.01 mm. In some embodiments, the distance between each flexible portion is greater than or equal to 0.01 mm, greater than or equal to 0.02 mm, greater than or equal to 0.03 mm, greater than or equal to 0.04 mm, greater than or equal to 0.05 mm, greater than or equal to 0.06 mm, greater than or equal to 0.07 mm, greater than or equal to 0.08 mm, greater than or equal to 0.09 mm, greater than or equal to 0.1 mm, or greater than or equal to 1 mm. Combinations of the foregoing range are also contemplated (e.g., less than or equal to 0.1 mm and greater than or equal to 0.08 mm). Other ranges are possible as this disclosure is not so limiting.

The plurality of grooves may be sized and shaped (or otherwise fabricated) to provide the plurality of flexible portions (e.g., protrusions, fingers, comb like extensions, tabs, teeth, etc.) with a desired stiffness where the compliance may correspond to an inverse of the provided stiffnesses. For example, flexible portions of a plate may have a stiffness that is greater than or equal to 0.05 Newtons/millimeter (N/mm), 0.1 N/mm, 0.15 N/mm, 0.2 N/mm, or other appropriate stiffness. The stiffness may also be less than or equal to 0.3 N/mm, 0.2 N/mm, 0.15 N/mm, 0.1 N/mm, or other appropriate stiffness. Combinations of the foregoing ranges are possible (e.g., greater than or equal to 0.05 N/mm and less than or equal to 0.3 N/mm). Of course, other ranges are possible as this disclosure is not so limited.

As noted above, in some embodiments, it may be desirable to apply a preload to a flexible recoater blade to help reduce the incidence of flinging of powder on a build surface during a scraping operation of the recoater blade across the build surface. In some embodiments, this preload may correspond to a threshold force that is applied at least partially in a direction that is out of plane with the recoater blade and is oriented in a direction that is opposite from a direction of motion of the recoater blade across the build surface during a recoating in scraping operation. For example, in one embodiment, the preload force may correspond approximately to the desired downward compaction force applied to the powder bed per flexible portion of a recoater blade and forces greater than this force applied to an associated flexible portion of a recoater blade may cause that portion of the recoater blade to deflect away from the build surface. In some embodiments, the preload force is greater than or equal to 0.2 Newtons (N), greater than or equal to 0.3 N, greater than or equal to 0.4 N, greater than or equal to 0.5 N, greater than or equal to 0.7 N, greater than or equal to 0.9 N, or greater than or equal to 1 N per mm of the length of the compliant recoater blade. In some embodiments, a preload force is less than or equal to 1 N, less than or equal to 0.9 N, less than or equal to 0.7 N, less than or equal to 0.5 N, less than or equal to 0.3 N, or other appropriate force. Combinations of the foregoing ranges are also possible (e.g., greater than or equal to 0.2 N and less than or equal to 1 N). Other ranges are possible.

The plates can be stacked or otherwise arranged adjacent to one another to form a plurality of plates. Each plate of the plurality of plates can be the same or independently varied (e.g., within the above-described plate parameters) and can be arranged such that the plurality of grooves (e.g., a first plurality of grooves) of each plate within the plurality of plates is staggered, or otherwise offset, from another plurality of grooves (e.g., a second plurality of grooves) of another plate within the plurality of plates. Any suitable number of plates can be used (e.g., at least 2 plates, at least 4 plates, at least 6 plates, at least 8 plates, at least 10 plates, etc.). For example, in some embodiments, the plurality of plates comprises a first plate and a second plate, wherein the first plate comprises a first set of grooves and the second plate comprises a second set of grooves and wherein the first set of grooves and the second set of grooves are staggered relative to one another.

In some embodiments, an offset distance between two plates of the plurality of plates less than or equal to 1 mm, less than or equal to 0.1 mm, less than or equal to 0.09 mm, less than or equal to 0.08 mm, less than or equal to 0.07 mm, less than or equal to 0.06 mm, less than or equal to 0.05 mm, less than or equal to 0.04 mm, less than or equal 0.03 mm, less than or equal to 0.02 mm, or less than or equal to 0.01 mm. In some embodiments, an offset distance between two plates of the plurality of plates is greater than or equal to 0.01 mm, greater than or equal to 0.02 mm, greater than or equal to 0.03 mm, greater than or equal to 0.04 mm, greater than or equal to 0.05 mm, greater than or equal to 0.06 mm, greater than or equal to 0.07 mm, greater than or equal to 0.08 mm, greater than or equal to 0.09 mm, greater than or equal to 0.1 mm, or greater than or equal to 1 mm. Combinations of the foregoing range are also contemplated (e.g., less than or equal to 0.1 mm and greater than or equal to 0.08 mm). Other ranges are possible.

The plates themselves can be made of a variety of materials. For example, in one embodiment, the plates comprise stainless steel and/or blue-tempered steel, and the plurality of grooves can be laser cut into the stainless steel. Of course, other materials are possible. Non-limiting examples include other metals (e.g., tungsten), other appropriate metals, and/or plastics. In some embodiments, the material of the plate is selected to match a material composition of the powder (e.g., a powder precursor material), which may advantageously reduce or prevent contamination (i.e., because if the blade and the powder are of the same material, the powder cannot contaminate the blade). Regardless of the specific material, the one or more plates may be made form a material exhibiting sufficient elasticity such that the flexible portions of the one or more plates, and the overall recoater blade, may elastically deform and return to an original configuration of the recoater blade during a recoating and scraping operation. Additionally other formation techniques such as machining, water jet cutting, grinding, electrodischarge machining (EDM), or other appropriate types of manufacturing processes may be used to form the grooves. In some embodiments, the plates can operate without significant thermal expansion. For example, the plates may include a material such that they are configured to operate continuously at a temperature between or equal to 60° C. and 100° C.

The recoater blade may include one or more plates as described above. The recoater blade is attached to a body of the recoater assembly with the grooves of the plates extending away from the body. When the recoater assembly is a part of an additive manufacturing system, these grooves may extend towards a build surface of the additive manufacturing surface such that they may sweep, or otherwise move across, the build surface. To facilitate compliance of the recoater blade, and to avoid unnecessary stress concentrations, the body may comprise a rounded surface the plurality of flexible portions are configured to be deformed against when a force is applied to the separate flexible portions, such as the normal force provide by the build surface as the recoater blade moves across.

In some embodiments, a clamp connects the recoater blade to the body. The clamp may include components for adjusting a position of the recoater blade, such as a leveling screen, which can be used to adjust an orientation of the recoater blade (e.g., so that the motion of the recoater blade is coplanar to the build surface). However, other connectors are contemplated. In some cases, no connector may be required at all, as the recoater blade can be integrally formed with the body. However, in other embodiments, the recoater blade is separately formed from and is attached to the body using a connector (e.g., a clamp).

In some embodiments, the recoater blade is connected to the body of the recoater assembly such that the plurality of plates of the recoater blade are angled towards a specific orientation relative to the body. In some such embodiments, when the recoater assembly is part of an additive manufacturing system, the recoater blade is angled relative to a build plate, a build surface, and/or a vertical direction of the recoater assembly when installed on an additive manufacturing system relative to a local direction of gravity (e.g., a plane parallel to the build plate or build surface). In some embodiments, the relative angle of the recoater blade and the build surface (or build plate) is greater than or equal to 15°, greater than or equal to 20°, or greater than or equal to 25°. In some embodiments, the relative angle of the recoater blade and the build surface (or build plate) is less than or equal to 25°, less than or equal to 20°, or less than or equal to 15°. Combinations of the foregoing ranges are also contemplated (e.g., greater than or equal to 15° or less than or equal to 25°). Of course, other ranges are possible as this disclosure is not so limiting. A leveling mount (e.g., a clamp) can be attached to the body to adjust a relative angle of the recoater blade and the build surface (or build plate). In some such embodiments, the leveling mount is configured to adjust a pose of the recoater blade relative to the build plate. For example, the leveling mount may be configured to controllably adjust a vertical position and/or orientation (i.e., an angle) of the recoater blade relative to the build plate and/or build surface.

The body of the recoater assembly may comprise a plurality of compliant attachments extending along a length of the body. The plurality of compliant attachments can be configured such that the compliance of the compliant attachments connected to the body increases emanating from a central compliant attachment of the plurality of compliant attachments, or simply a central portion of the body, towards the opposing end portions along the length of the body. That is to say, in some embodiments, a compliance of the compliant attachments increases from a central portion of the body towards an outer portion of the body along the length of the body. This may be accomplished in variety of ways. In some embodiments, the plurality of compliant attachments are made of the same material, and the central compliant attachment is larger in size and/or includes no cutouts or smaller cutouts (and hence is more rigid) relative to other compliant attachments, while other compliant attachments of the plurality of compliant attachments are smaller in size, and/or include relatively larger cutouts (and hence are less rigid). In some embodiments, the materials of the plurality of compliant attachments are varied, with a more rigid material used for the central compliant attachment and less rigid materials used for the other compliant attachments. Those skilled in the art in view of this disclosure will recognize other ways to vary the compliance of the plurality of attachments.

When the material of the plurality of compliant attachments is the same, the compliance of the plurality of compliant attachments can be controlled by varying the amount of material for each compliant attachment. For example, each compliant attachment can be of the same overall size or set of dimensions, but cutouts of the material can be removed to form more compliant attachments. The central compliant attachment, for example, can have more material relative to other compliant attachments without the presence of a cutout (e.g., a first set of compliant attachments disposed on a first side of the central compliant attachment, a second set of compliant attachments disposed on a second side of the central compliant attachment opposite from the first side), while other compliant attachments have larger cutouts and/or are smaller in size.

The plurality of compliant attachments of the body can connect the recoater assembly, and associated recoater blade, to one or more other portions of an additive manufacturing system. For example, in some embodiments, the compliant attachments include a notch or other appropriately shaped hole, or other type of attachment, that is configured to be attached to a motion stage (e.g., a motion stage that is configured to be moved in a horizontal direction and/or parallel to the build plate or build surface). In some embodiments, the motion stage may correspond to a structure supported by rails, linear bearings, shafts, wheels, combinations of the above, or other appropriate structures that are configured to be moved by an associated one or more actuators. Thus, the recoater assembly may be moved relative to the build surface during operation.

As noted above, the body may also have a pair of scoops attached to opposing end portions of the body with the recoater blade extending between the pair of scoops. As described elsewhere herein, the scoops can collect powder material (e.g., precursor powder material) as the recoater assembly moves the recoater blade along the build surface. Advantageously, this reduces waste of the powder material, as the scoops can collect powder material from being lost during fabrication of the overall object. The pair of scoops may be sized and shaped to collect (or recollect) a predetermined amount of powder material. For example, the pair of scoops may be sized and shaped to collect powder material that is in excess of that used to cover a build plate with a layer of precursor material with a predetermined thickness. However, other dimensions are possible and those skilled in the art in view of this disclosure will be capable of appropriately sizing the pair of scoops. And while some embodiments describe a pair of scoops, it should be understood that other suitable numbers of scoops are possible. For some embodiments, the recoater assembly is configured to dispense an excess amount of powder to form a layer of powder precursor material disposed on the build plate, and wherein a volume of the pair of scoops is greater than or equal to a volume of the excess amount of powder. In this manner, the pair of scoops can hold the excess amount of powder.

In some embodiments, the scoops have a particular dimension (e.g., a depth parallel to the direction of motion of the recoater assembly and/or a motion stage attached to the recoater assembly during operation). For example, for some embodiments, a depth of the one or more scoops (e.g., a pair of scoops) is greater than or equal to 1 mm, greater than or equal to 3 mm, greater than or equal to 5 mm, greater than or equal to 7 mm, or greater than or equal to 10 mm. In some embodiments, a depth of the one or more scoops is less than or equal to 10 mm, less than or equal to 7 mm, less than or equal to 5 mm, less than or equal to 3 mm, or less than or equal to 1 mm. Combinations of the foregoing ranges are possible (e.g., greater than or equal to 1 mm and less than or equal to 50 mm). Any appropriate length of the scoops parallel to a length of the recoater blade may also be used including, for example, lengths that are greater than or equal to 10 mm, 20 mm, 30 mm, or other appropriate dimension. The length of the scoops may also be less than or equal to 50 mm, 40 mm, 30 mm, or other appropriate dimensions. This may include a scoop with a length that is between or equal to 10 mm and 50 mm. Other ranges are possible.

In some embodiments, one or more scoops (e.g., a pair of scoops) extends beyond the recoater blade. For some such embodiments, the relative height of the one more scoops (e.g., relative to a vertical direction and/or perpendicular to the build surface) can be of a suitable distance beyond the recoater blade such that the scoops extend both above and below the build surface to increase recovery of the powder material (e.g., the powder precursor material). As was mentioned elsewhere herein, when the one or more scoops extends beyond the recoater blade, it may be positioned at or below a build surface when the recoater assembly is a part of an additive manufacturing system. In some embodiments, one or more scoops extends beyond the recoater blade by a distance of greater than or equal to 1 mm, greater than or equal to 3 mm, greater than or equal to 5 mm, greater than or equal to 7 mm, or greater than or equal to 10 mm. In some embodiments, one or more scoops extends beyond the recoater blade by a distance of less than or equal to 10 mm, less than or equal to 7 mm, less than or equal to 5 mm, less than or equal to 3 mm, or less than or equal to 1 mm. Combinations of the foregoing ranges are also contemplated (e.g., greater than or equal to 5 mm and less than or equal to 10 mm). Of course, other ranges are possible as this disclosure is not so limiting.

The above-described features and ranges can be a part of any of the embodiments of an additive manufacturing system and/or recoater assembly as described elsewhere herein either collectively or individually. Of course, the additive manufacturing system may include other components and ranges. For example, the additive manufacturing system may further comprise one or more laser energy sources. In some embodiments, the additive manufacturing system further comprises an optics assembly movable relative to the build plate and configured to direct laser energy from the one or more laser energy sources toward a build surface on the build plate to melt at least a portion of a layer of material disposed on the build surface.

Figure 9:
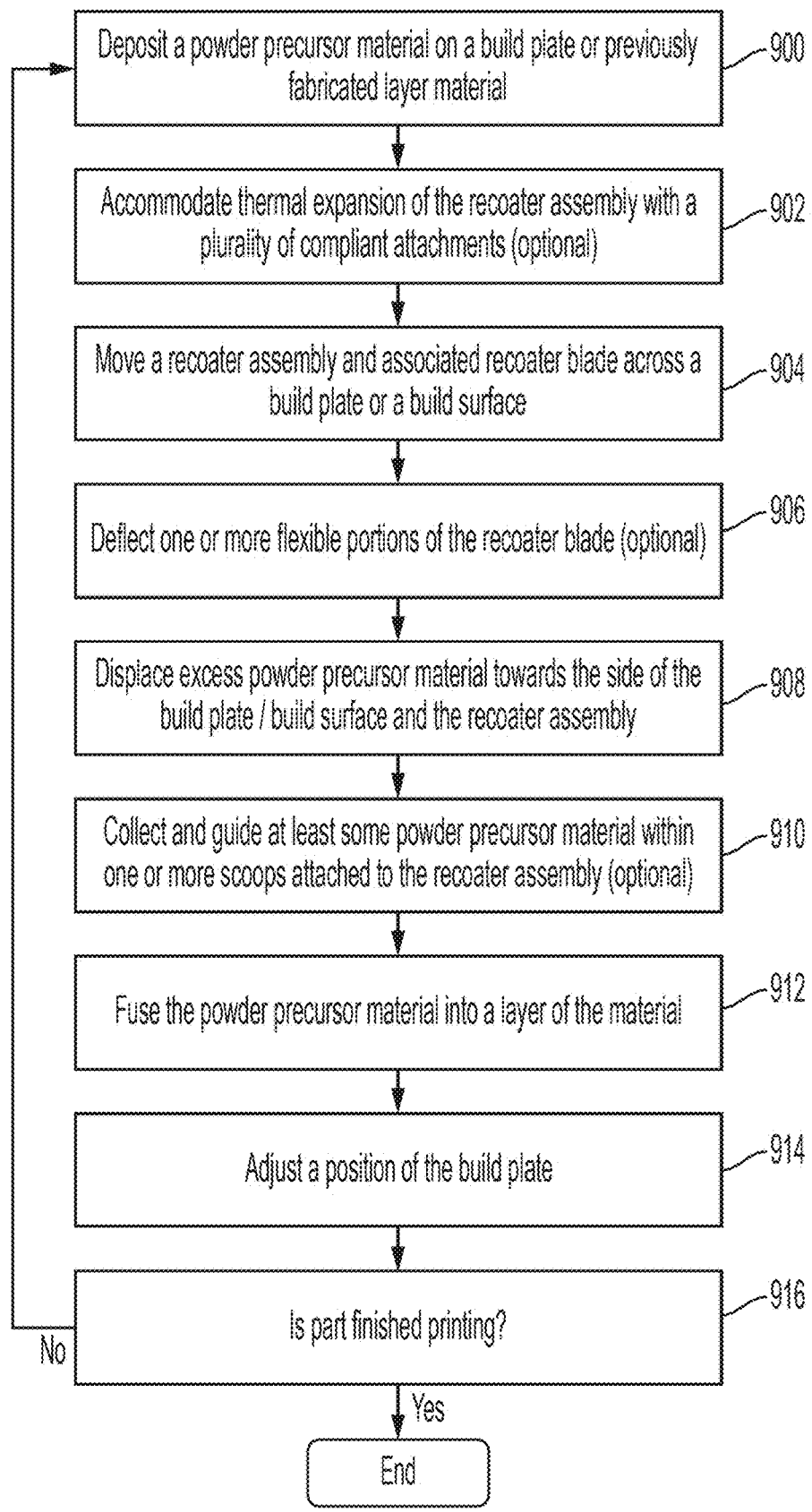
FIG. 9 is a flow process diagram depicting various methods, according to some embodiments.

Methods for additively fabricating an object using any one or more of the recoater assemblies and/or recoater blades described here are detailed further below. FIG. 9 is a flow diagram that illustrates steps of these methods but, of course, other components of the method are possible and are described elsewhere herein. For example, FIG. 9 describes a method for additively fabricating an object. A powder precursor material is deposited on a build plate or previously fabricated layer material at 900 forming a build surface. As described above, a recoater blade (e.g., comprising one or more plates comprising a plurality of grooves) may optionally be attached to a body comprising a plurality of compliant attachments configured to attach the recoater assembly to an associated horizontal movement stage for moving the recoater assembly across the build surface. These compliant attachments may be configured to accommodate thermal expansion and mismatch of the recoater assembly relative to the associated portion of the horizontal movement stage the recoater assembly is attached to at 902. In either case, the recoater blade which may comprise a plurality plates (e.g., wherein at least one plate of the plurality of plates comprises a plurality of grooves or a plurality of flexible portions formed by the plurality of grooves) and may be moved across the build surface at 904 during a recoating and scraping operation. This movement of the recoater blade across the build surface may smooth the powder layer such that the upper exposed build surface lies within a desired reference plane. This reference plane the build surface is disposed within may correspond to a plane within which the laser energy pixels are focus such that the laser energy pixels may be used to appropriately melt and fuse the precursor material including the build surface.

As detailed above, the recoater blade may optionally include a plurality of flexible portions along its length that are configured to deflect relative to one another and the build surface when a force greater than a threshold force is applied to an associated flexible portion of the blade when it contacts a defect or other unexpected feature on the build surface at 906. To help mitigate or prevent flinging of powder and improve compaction of the powder, the recoater blade may be angled relative to the build surface. Thus, as the recoater blade including flexible portions is moved across the build plate or a build surface at an angle relative to the build plate or the build surface, the powder precursor material (or at least a portion of the powder precursor material) may be compacted in a downwards direction towards the build surface and outward flinging of the material may be reduced.

As indicated at 908, during movement of the recoater blade across the build surface, excess powder (e.g., a powder precursor material) may be at least partially displaced towards the sides of the recoater assembly as well as the associated sides of the build plate and build surface in addition to be scraped in a direction of movement of the recoater assembly. Thus, one or more scoops, including for example, a pair of scoops positioned adjacent to opposing end portions of the recoater blade, may be used to collect and guide at least some of the excess powder precursor material at 910. Specifically, the one or more scoops may collect powder within a volume of the scoop as the scoop is translated over platform located adjacent to the build surface. The collected pile of powder may be moved in a direction that is aligned with a direction of movement of the recoater assembly during a recoating and scraping operation. This may be in addition to the movement of a pile of powder ahead of the recoater blade. The relative size and position of these separate piles of precursor material (e.g., the primary pile in contact with the recoater blade and the one or more secondary piles in contact with the one or more scoops) may help to bias some of the excess material back inwards towards the interior of the build surface and away from the path of travel of the one or more scoops. Additionally, the scoops may optionally guide the collected excess powder to an appropriate port for collection and reuse either during the current manufacturing process and/or a subsequently performed manufacturing process.

After forming a desired layer of precursor material on the build surface, the precursor material can be fused (e.g., by a laser) into a layer of the part being formed at 912. The height of the newly fabricated layer can then be adjusted vertically downward relative to the recoater assembly, for example, by using a vertical movement stage at 914. If the part is finished 916 the process may finish. If the part is not finished the recoating and fusing processes may be continued until the final part is completed after which the process may end and the part may be removed for appropriate post manufacturing processing.

The above methods may be implemented by one or more controllers including at least one processor operatively coupled to the various controllable portions of an additive manufacturing system as disclosed herein. The method may be embodied as computer readable instructions stored on non-transitory computer readable memory associated with the at least one processor such that when executed by the at least one processor the additive manufacturing system may perform any of the actions related to the methods disclosed herein. Additionally, it should be understood that the disclosed order of the steps is exemplary and that the disclosed steps may be performed in a different order, simultaneously, and/or may include one or more additional intermediate steps not shown as the disclosure is not so limited.

In some embodiments, the above described features either alone or in combination with one another may improve a speed, uniformity, and/or repeatability of a recoating process. For example, in some embodiments, the speed of motion of the recoater blade can be increased, such that the recoater blade can be moved across the build surface at a faster rate compared to conventional recoater blades of additive manufacturing systems without the formation of significant defects in the build surface (and/or the resulting fabricated part). In some embodiment, the recoater blade passes across the build surface during a recoating and scraping operation with a velocity of greater than or equal to 1 mm/s, greater than or equal to 5 mm/s, greater than or equal to 10 mm/s, greater than or equal to 20 mm/s, or other appropriate speed. In some embodiments, the recoater blade passes across the build surface with a velocity of less than or equal to 50 mm/s, less than or equal to 40 mm/s, less than or equal to 30 mm/s, less than or equal to 20 mm/s, less than or equal to 10 mm/s, or other appropriate velocity. Combinations of the foregoing ranges are also contemplated (e.g., greater than or equal to 5 mm/s and less than or equal to 50 mm/s). Other ranges are possible.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device including one or more processors may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A recoater assembly, comprising:
a recoater blade comprising a plurality of plates, wherein at least one plate of the plurality of plates comprises a plurality of grooves forming a plurality of separate flexible portions extending from a first portion including a first edge of the at least one plate towards a second edge of the at least one plate opposite the first edge; and
a body comprising a rounded surface, wherein the plurality of separate flexible portions is configured to be deformed against the rounded surface when a force is applied to the plurality of separate flexible portions, wherein the plurality of plates of the recoater blade is attached to the body with the plurality of grooves of the at least one plate extending away from the body.

2. The recoater assembly of claim 1, wherein the plurality of plates comprises a first plate and a second plate, wherein the first plate comprises a first set of the grooves and the second plate comprises a second set of the grooves and wherein the first set of grooves and the second set of grooves are staggered relative to one another.

3. The recoater assembly of claim 1, wherein the plurality of separate flexible portions are disposed between the plurality of grooves and arranged along a length of the at least one plate.

4. The recoater assembly of claim 1, wherein the plurality of separate flexible portions have a spring force of greater than or equal to 0.25 N and less than or equal to 2 N.

5. The recoater assembly of claim 1, wherein a dimension of the plurality of grooves extending from the first edge towards the second edge is greater than or equal to 1 mm and less than or equal to 50 mm.

6. The recoater assembly of claim 1, wherein a groove-to-groove spacing of the plurality of grooves is greater than or equal to 0.1 mm and less than or equal to 2 mm.

7. The recoater assembly of claim 1, wherein the recoater assembly is configured to dispense a powder precursor material onto a build surface.

8. The recoater assembly of claim 1, wherein the plurality of plates comprise greater than or equal to 2 plates and less than or equal to 10 plates.

9. The recoater assembly of claim 1, further comprising a clamp connecting the recoater blade to the body.

10. The recoater assembly of claim 1, wherein the body comprises a central compliant attachment configured to connect the recoater assembly to a motion stage.

11. The recoater assembly of claim 1, wherein the body comprises a plurality of compliant attachments configured to attach the recoater assembly to a motion stage.

12. The recoater assembly of claim 11, wherein a compliance of the plurality of compliant attachments increases from a central portion of the body towards opposing end portions of the body.

13. The recoater assembly of claim 1, wherein each plate of the plurality of plates includes a separate plurality of the grooves offset from the plurality of grooves formed in adjacent plates of the plurality of plates.

14. The recoater assembly of claim 13, wherein the separate plurality of the grooves offset from the plurality of grooves of the plurality of plates does not include a straight path extending through the grooves from a front surface of the recoater blade to a back surface of the recoater blade.

15. The recoater assembly of claim 1, wherein the recoater blade is angled relative to a vertical direction of the recoater assembly when installed on an additive manufacturing system.

16. The recoater assembly of claim 1, wherein the at least one plate is configured to elastically deform during a recoating and scraping operation.

17. The recoater assembly of claim 1, wherein the at least one plate is configured to operate continuously at a temperature between or equal to 60° C. and 100° C.

18. The recoater assembly of claim 1, further comprising a pair of scoops attached to opposing end portions of the body with the recoater blade extending between the pair of scoops, wherein the recoater blade and the pair of scoops extend away from the body, and wherein the pair of scopes extend beyond the recoater blade.

19. An additive manufacturing system, comprising:
a build plate;
the recoater assembly of claim 1; and
a motion stage, wherein the recoater assembly is attached to the motion stage, and wherein the motion stage is configured to move the recoater assembly relative to the build plate.

20. The additive manufacturing system of claim 19, further comprising one or more laser energy sources.

21. The additive manufacturing system of claim 20, further comprising an optics assembly movable relative to the build plate and configured to direct laser energy from the one or more laser energy sources toward a build surface on the build plate to melt at least a portion of a layer of material disposed on the build surface.

22. The additive manufacturing system of claim 19, wherein the recoater blade is angled relative to the build plate.

23. The additive manufacturing system of claim 19, wherein an angle between the recoater blade and a plane parallel to the build plate is greater than or equal to 15° and less than or equal to 25°.

24. The additive manufacturing system of claim 19, further comprising a leveling mount configured to adjust a vertical position of the recoater blade relative to the build plate.

25. The additive manufacturing system of claim 24, wherein the leveling mount is configured to adjust an orientation of the recoater blade relative to the build plate.

* * * * *